(12) United States Patent
Ikeda et al.

(10) Patent No.: US 10,585,531 B2
(45) Date of Patent: Mar. 10, 2020

(54) INFORMATION PROCESSING APPARATUS, CONTROL METHOD, AND PROGRAM

(71) Applicant: SONY CORPORATION, Tokyo (JP)

(72) Inventors: Tetsuo Ikeda, Tokyo (JP); Ryuji Nakayama, Kanagawa (JP); Kazuto Nishizawa, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 15/327,070

(22) PCT Filed: Aug. 25, 2015

(86) PCT No.: PCT/JP2015/004276
§ 371 (c)(1),
(2) Date: Jan. 18, 2017

(87) PCT Pub. No.: WO2016/035283
PCT Pub. Date: Mar. 10, 2016

(65) Prior Publication Data
US 2017/0168651 A1 Jun. 15, 2017

(30) Foreign Application Priority Data
Sep. 2, 2014 (JP) ................... 2014-177929

(51) Int. Cl.
*G06F 3/042* (2006.01)
*G06F 3/01* (2006.01)
(Continued)

(52) U.S. Cl.
CPC ............ *G06F 3/0425* (2013.01); *G06F 3/011* (2013.01); *G06F 3/03* (2013.01); *G06F 3/04812* (2013.01);
(Continued)

(58) Field of Classification Search
None
See application file for complete search history.

(56) References Cited

U.S. PATENT DOCUMENTS 5,862,229 A * 1/1999 Shimizu .................. A63F 13/02
345/419
6,196,917 B1 * 3/2001 Mathias .................. A63F 13/10
463/2
(Continued)

FOREIGN PATENT DOCUMENTS

| CN | 102473035 A | 5/2012 |
| JP | 06-044001 | 2/1994 |

(Continued)

OTHER PUBLICATIONS

Feb. 27, 2018, Japanese Office Action issued for related JP Application No. 2014-177929.
(Continued)

*Primary Examiner* — Matthew Yeung
(74) *Attorney, Agent, or Firm* — Paratus Law Group, PLLC

(57) ABSTRACT

There is provided an information processing apparatus including circuitry configured to initiate display of a virtual object, based on a gesture operation, starting from a point of origin and moving towards a target point; and continue to display the virtual object in display motion after the gesture operation, wherein a path of travel of the virtual object or a display characteristic of the virtual object is determined based on a positional relationship between the virtual object and another object that is a real object located in proximity to the path of travel of the virtual object.

22 Claims, 40 Drawing Sheets

(51) Int. Cl.
*G06F 3/0481* (2013.01)
*G06F 3/03* (2006.01)
*G06F 3/0488* (2013.01)

(52) U.S. Cl.
CPC ...... *G06F 3/04815* (2013.01); *G06F 3/04883* (2013.01)

(56) References Cited

U.S. PATENT DOCUMENTS

| | | | | |
|---|---|---|---|---|
| 2003/0011768 | A1* | 1/2003 | Jung | A61B 5/0088 356/326 |
| 2005/0245302 | A1* | 11/2005 | Bathiche | A63F 13/00 463/1 |
| 2006/0001650 | A1* | 1/2006 | Robbins | G06F 3/0421 345/173 |
| 2008/0026838 | A1* | 1/2008 | Dunstan | A63F 13/00 463/30 |
| 2009/0135162 | A1* | 5/2009 | Van De Wijdeven | G06F 3/0421 345/175 |
| 2009/0307623 | A1* | 12/2009 | Agarawala | G06F 3/04815 715/765 |
| 2010/0060648 | A1* | 3/2010 | Carter | A63F 13/12 345/474 |
| 2010/0085330 | A1* | 4/2010 | Newton | G06F 3/0425 345/175 |
| 2011/0018697 | A1 | 1/2011 | Birnbaum | |
| 2011/0037732 | A1* | 2/2011 | Takama | G06F 3/0412 345/175 |
| 2011/0291964 | A1* | 12/2011 | Chambers | G06F 1/1616 345/173 |
| 2011/0294433 | A1* | 12/2011 | Matsubara | H04M 1/7253 455/41.3 |
| 2012/0032979 | A1* | 2/2012 | Blow | G06F 1/1626 345/647 |
| 2012/0249595 | A1* | 10/2012 | Feinstein | G06F 1/1694 345/642 |
| 2014/0025513 | A1* | 1/2014 | Cooke | G06Q 20/3278 705/17 |
| 2014/0078175 | A1 | 3/2014 | Forutanpour et al. | |
| 2014/0101578 | A1* | 4/2014 | Kwak | G06F 3/017 715/761 |
| 2015/0094127 | A1* | 4/2015 | Canose | A63F 13/42 463/2 |

FOREIGN PATENT DOCUMENTS

| | | |
|---|---|---|
| JP | 2005-317032 A | 11/2005 |
| JP | 2013-500516 A | 1/2013 |
| JP | 2014-010838 A | 1/2014 |
| WO | WO2013/147804 A1 | 10/2013 |

OTHER PUBLICATIONS

May 29, 2018, Japanese Office Action issued for related JP Application No. 2014-177929.
Feb. 22, 2019, European Search Report issued for related EP Application No. 15763655.6.
Apr. 25, 2019, Chinese Office Action issued for related CN Application No. 201580045474.0.

* cited by examiner

[Fig. 1]
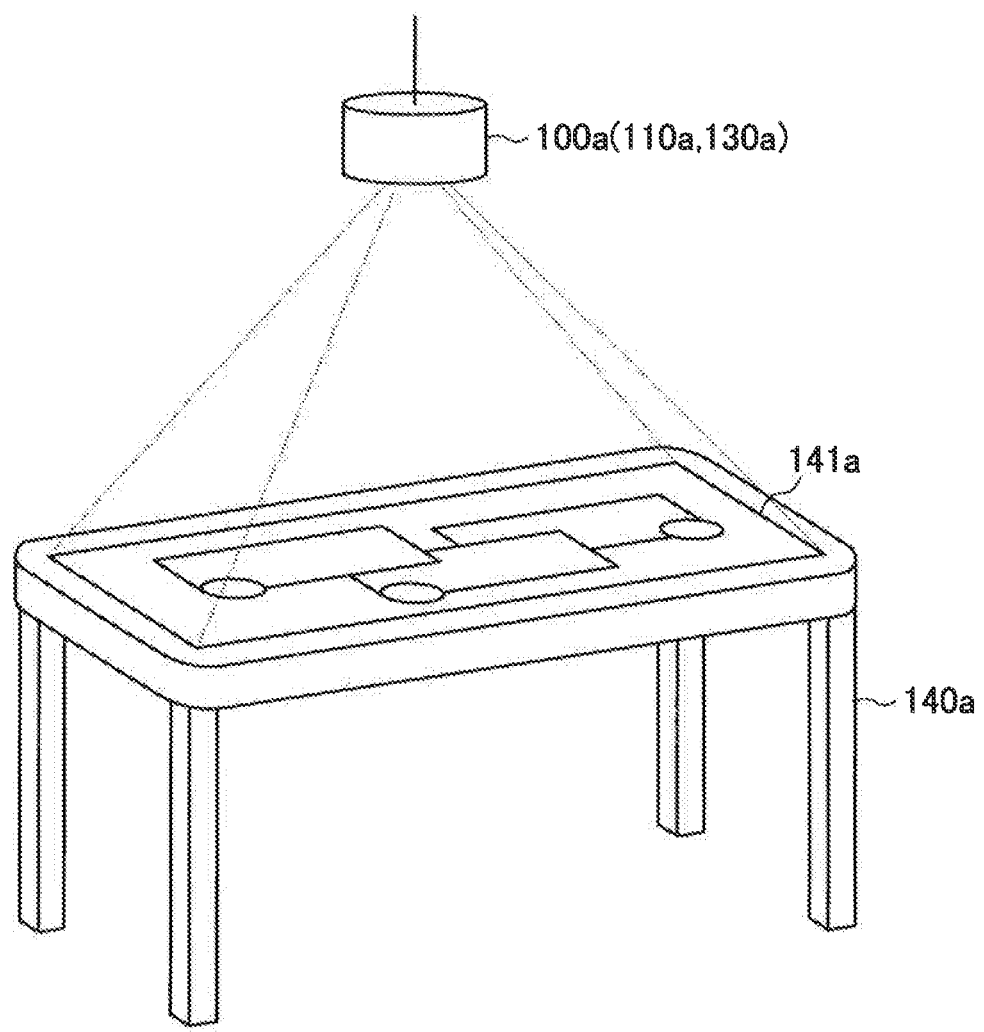

[Fig. 2]
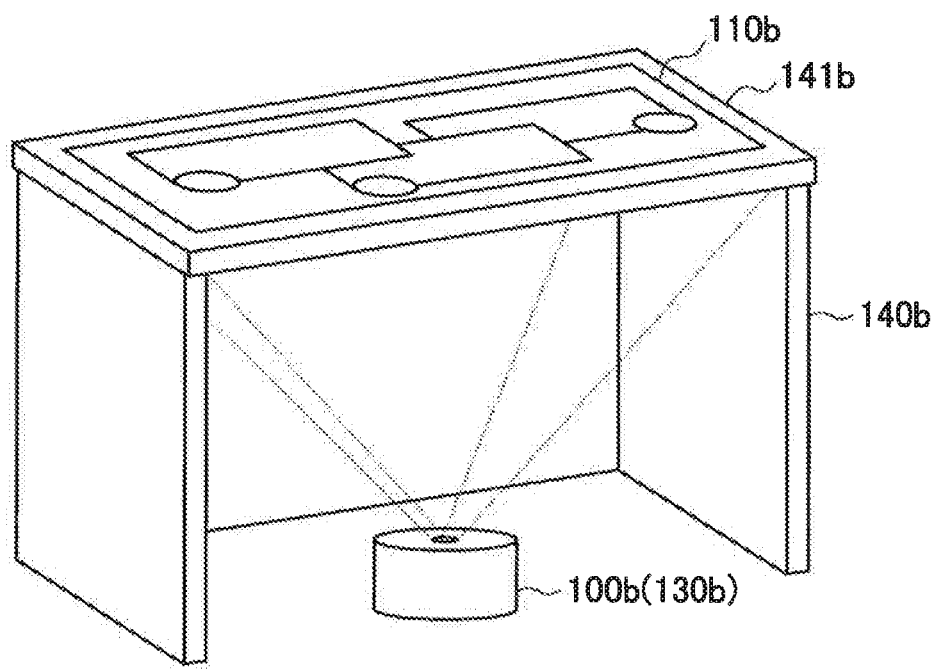

[Fig. 3]
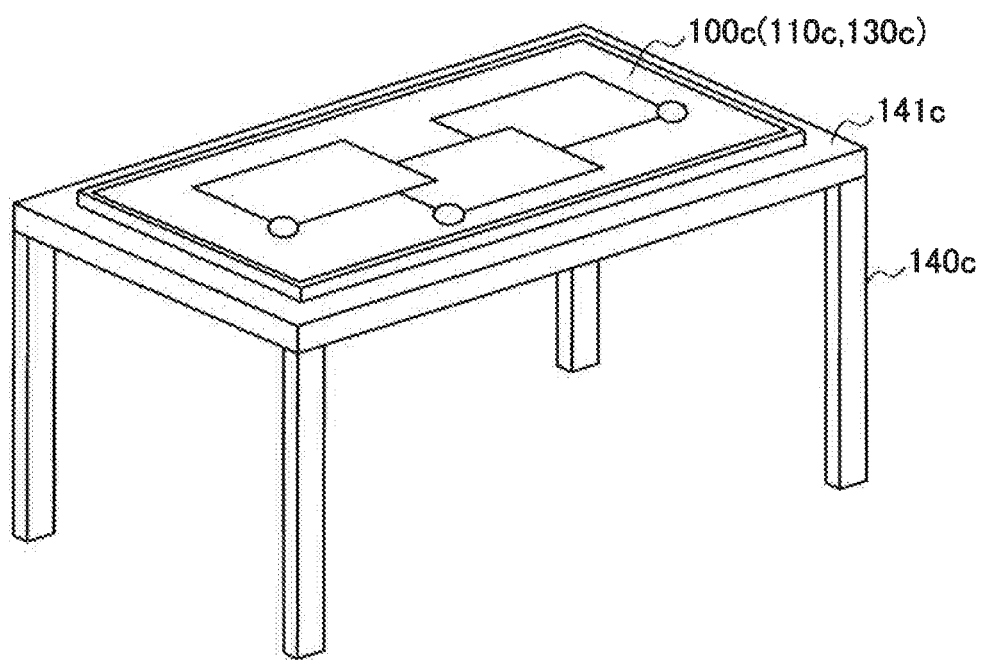

[Fig. 4]
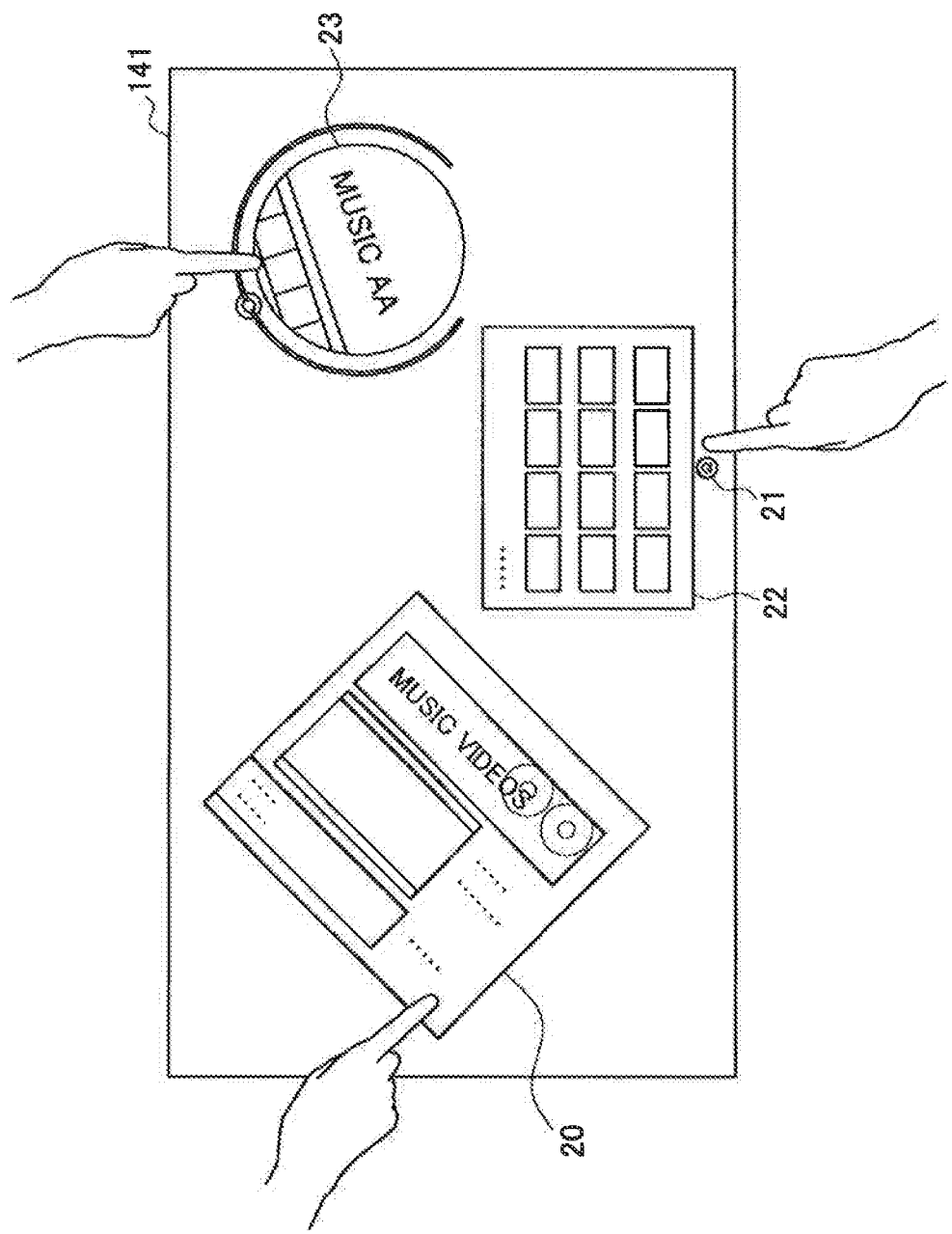

[Fig. 5]
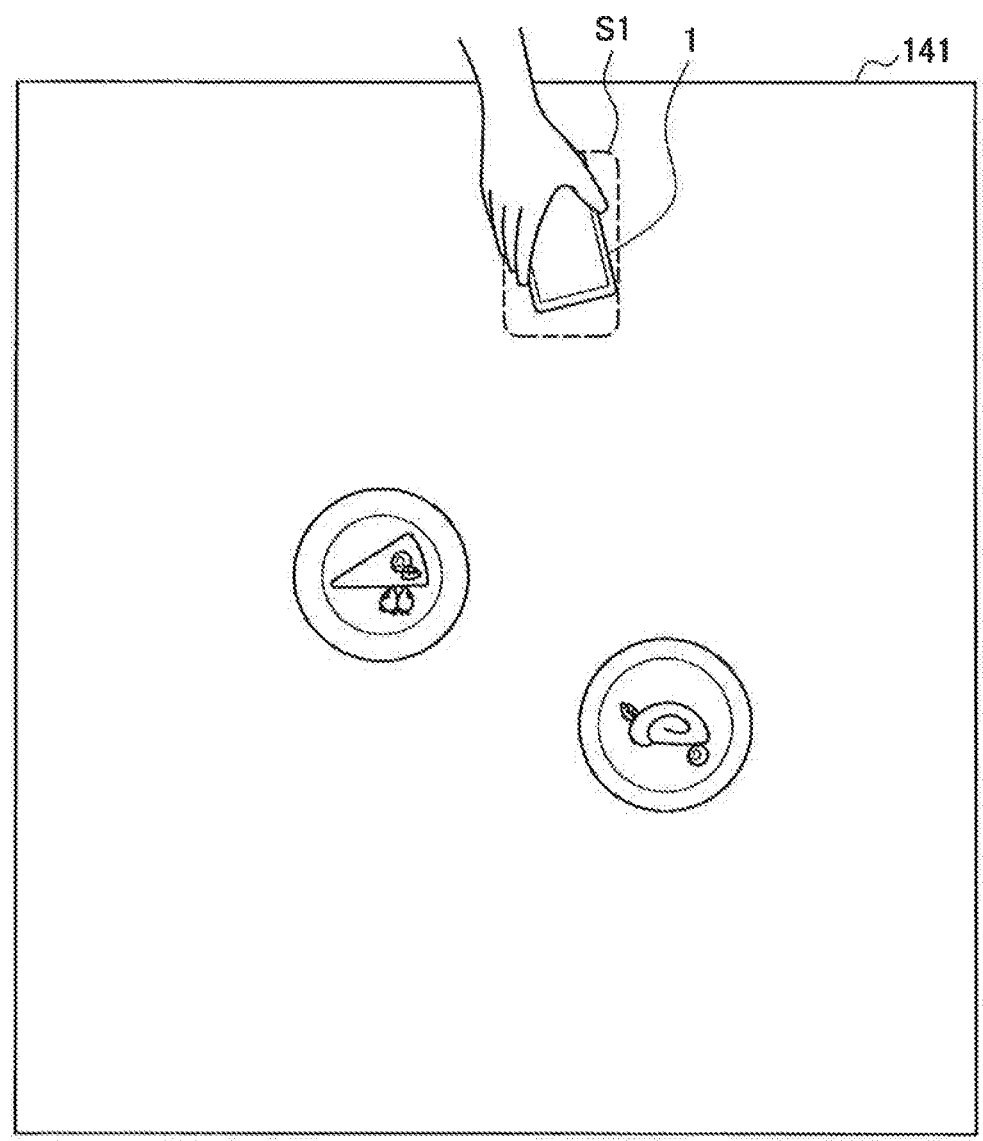

[Fig. 6]
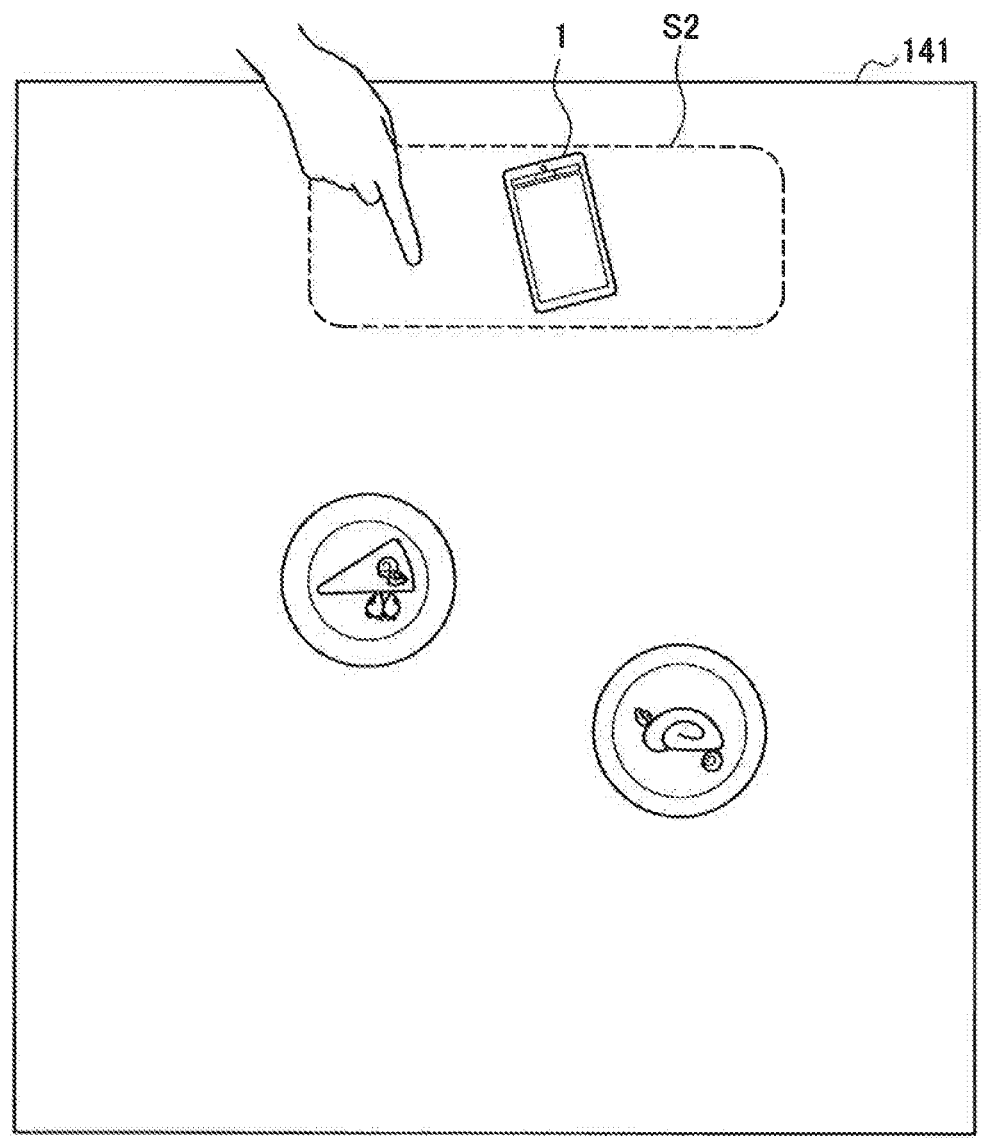

[Fig. 7]
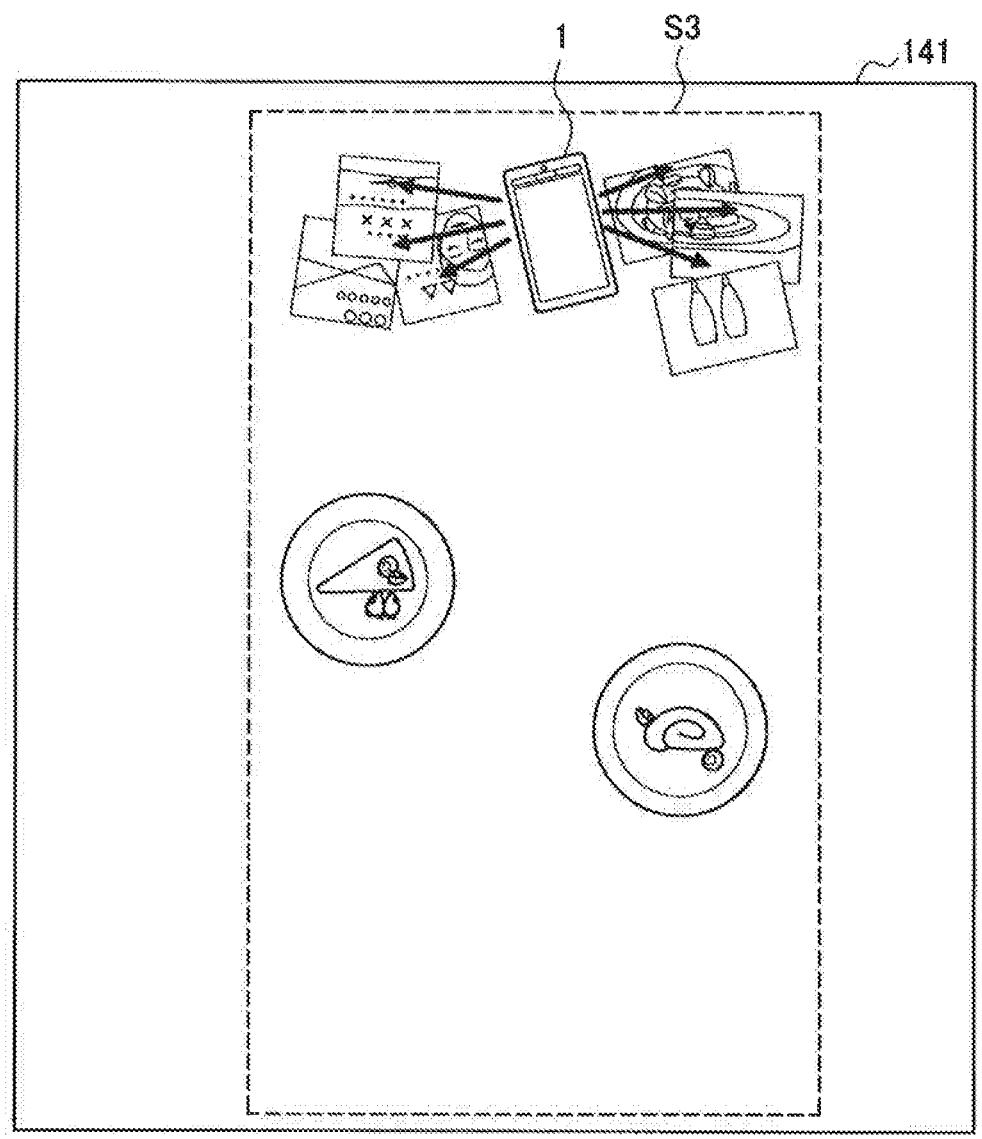

[Fig. 8]
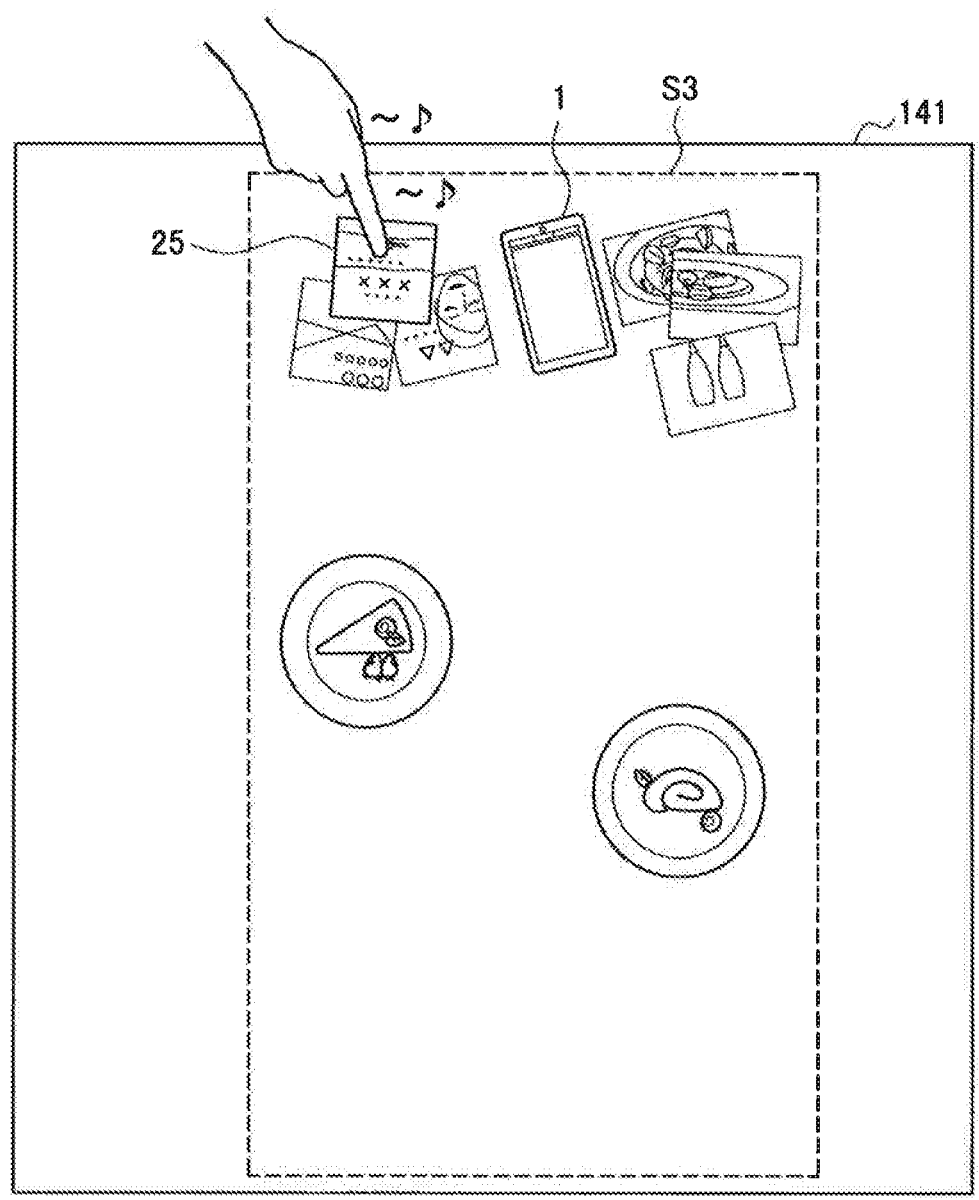

[Fig. 9]
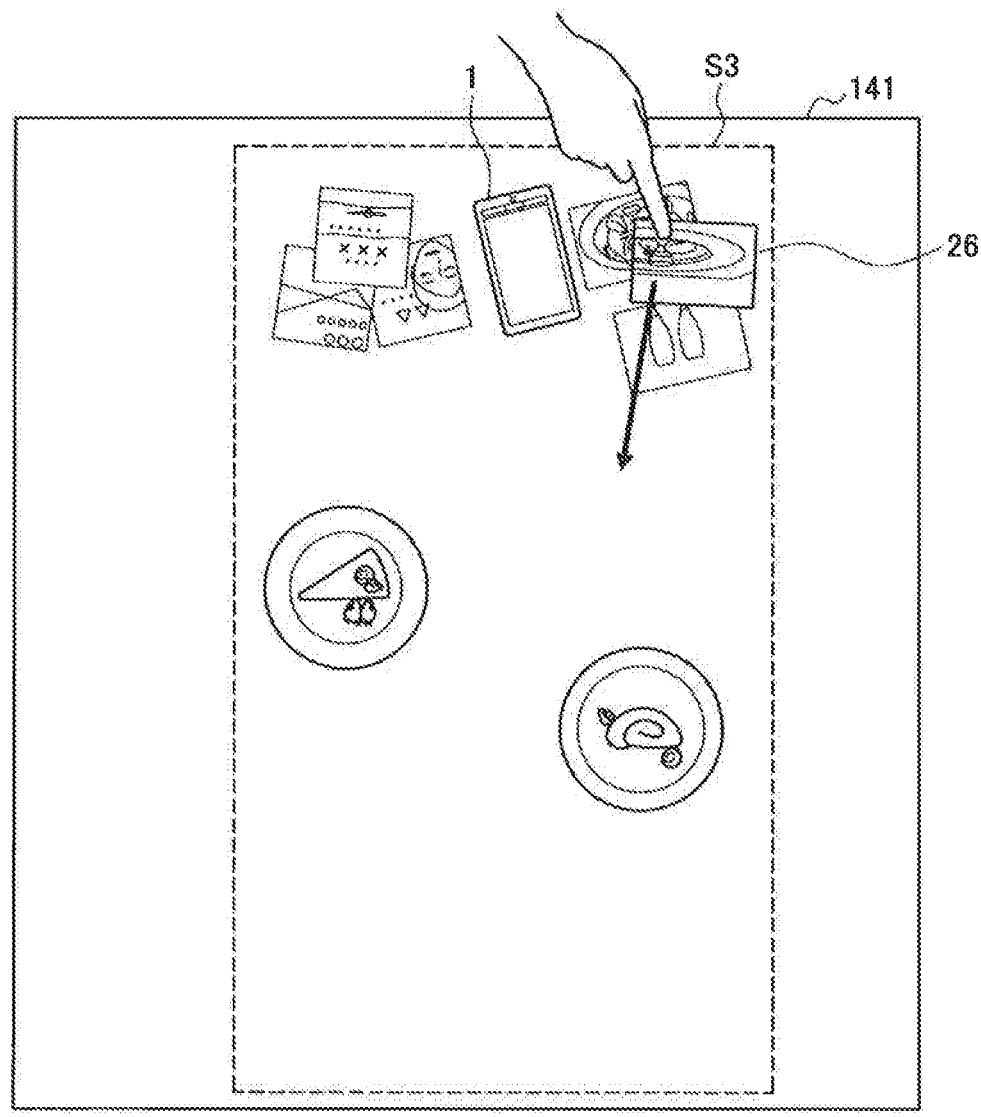

[Fig. 10]
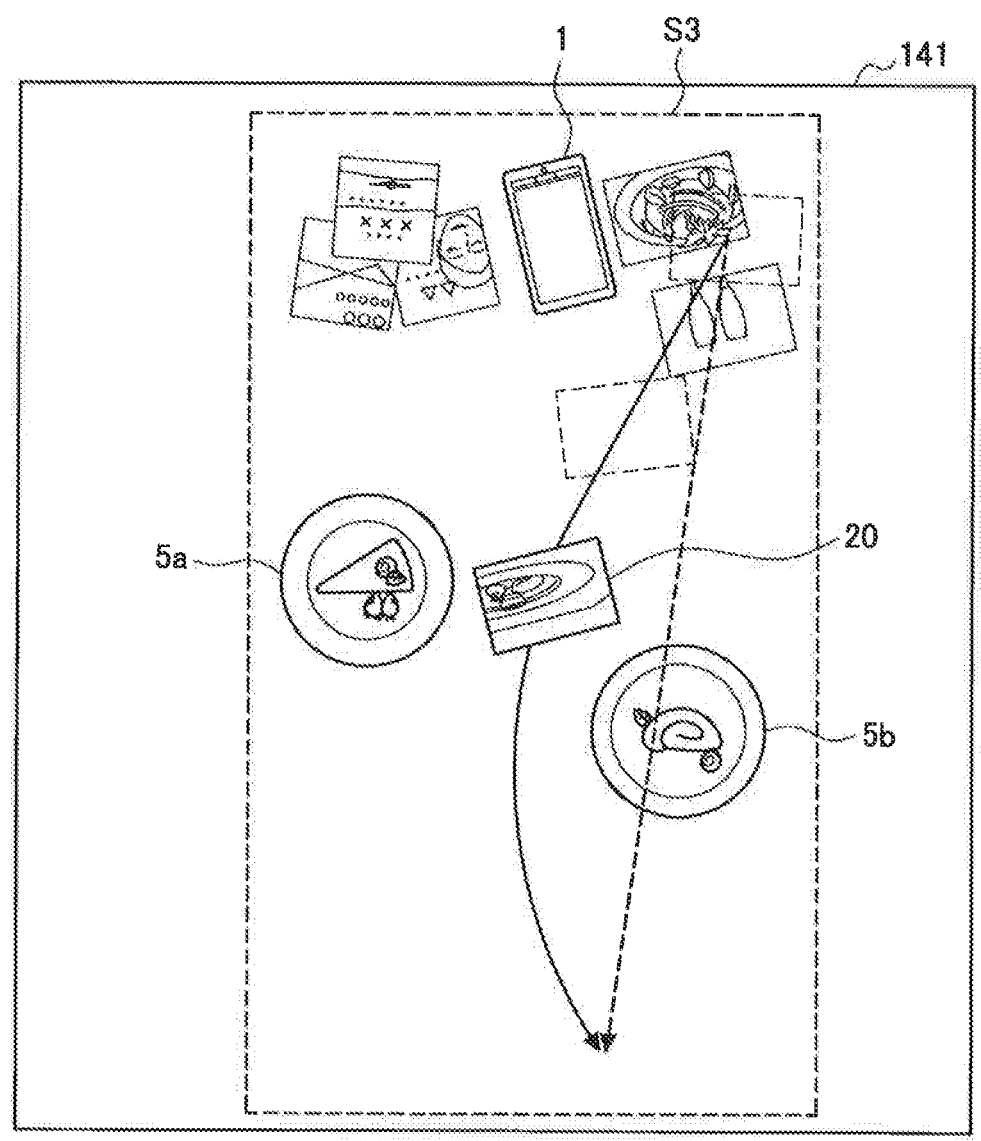

[Fig. 11]
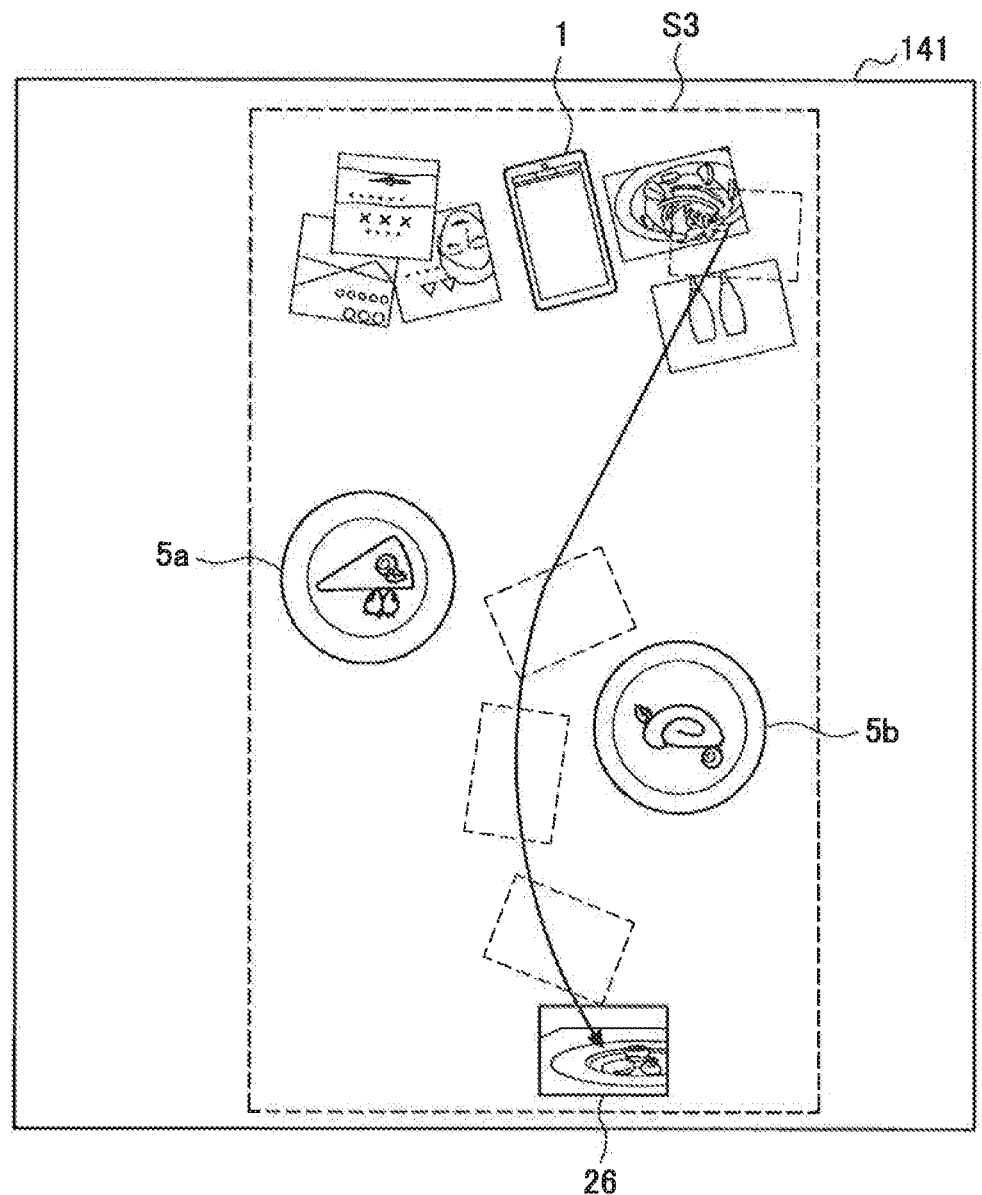

[Fig. 12]
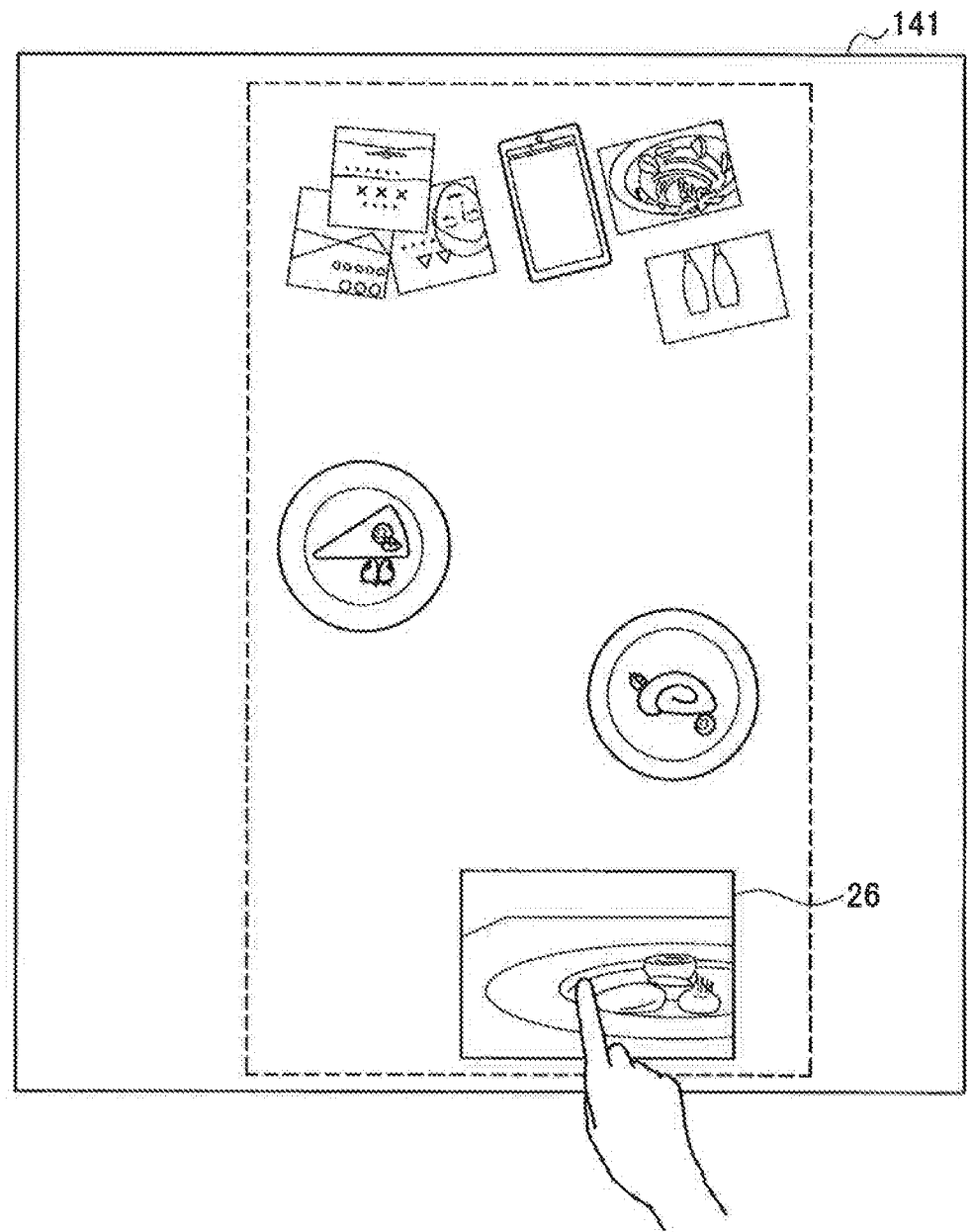

[Fig. 13]
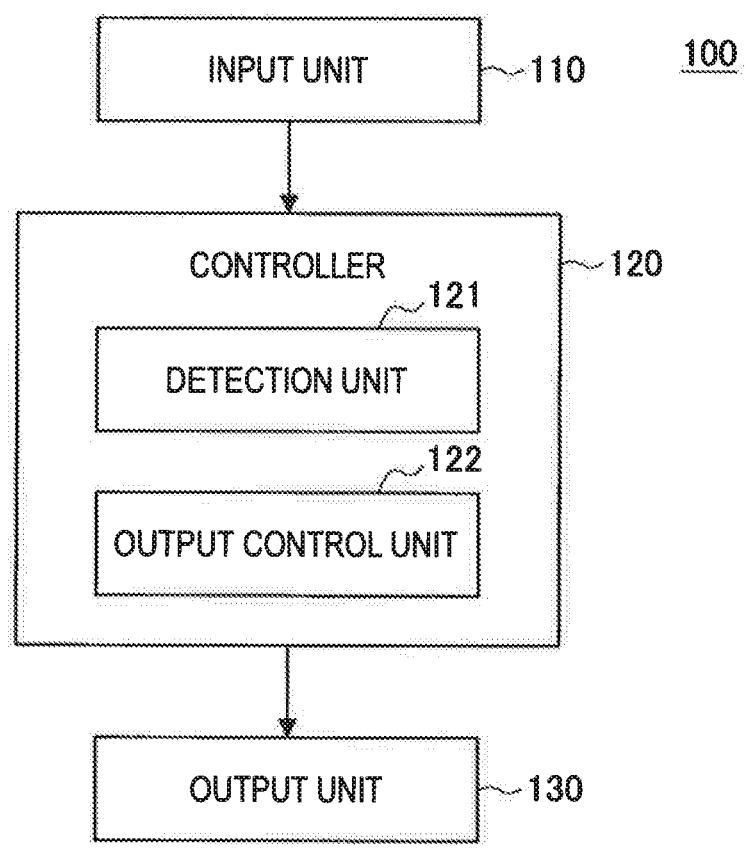

[Fig. 14]
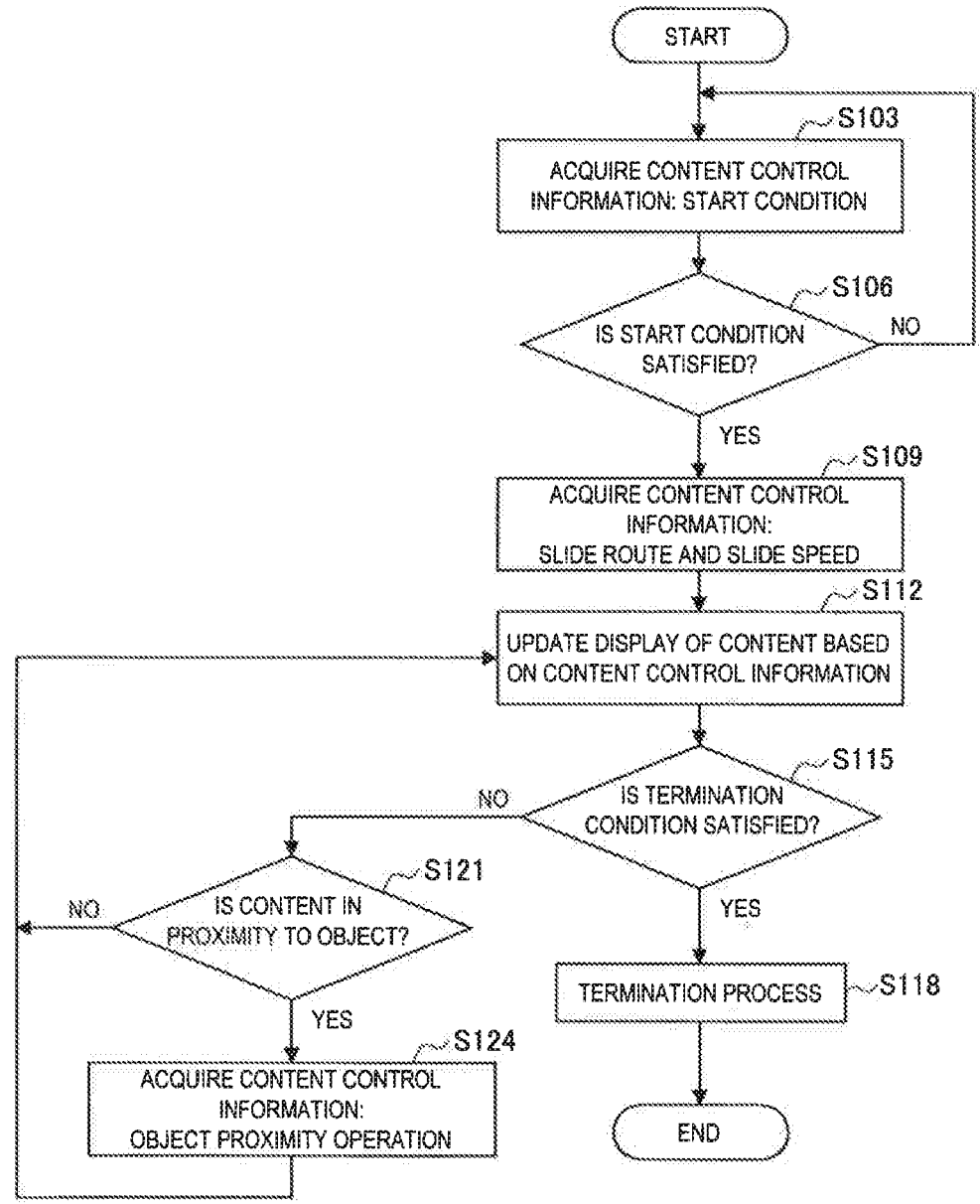

[Fig. 15]
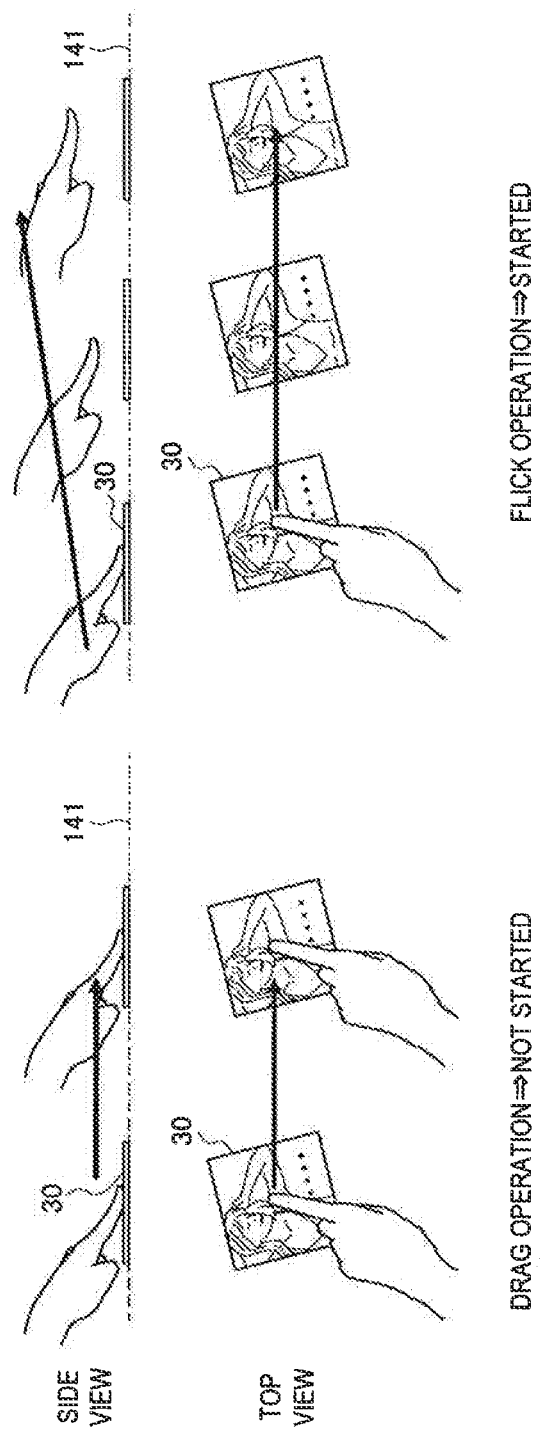

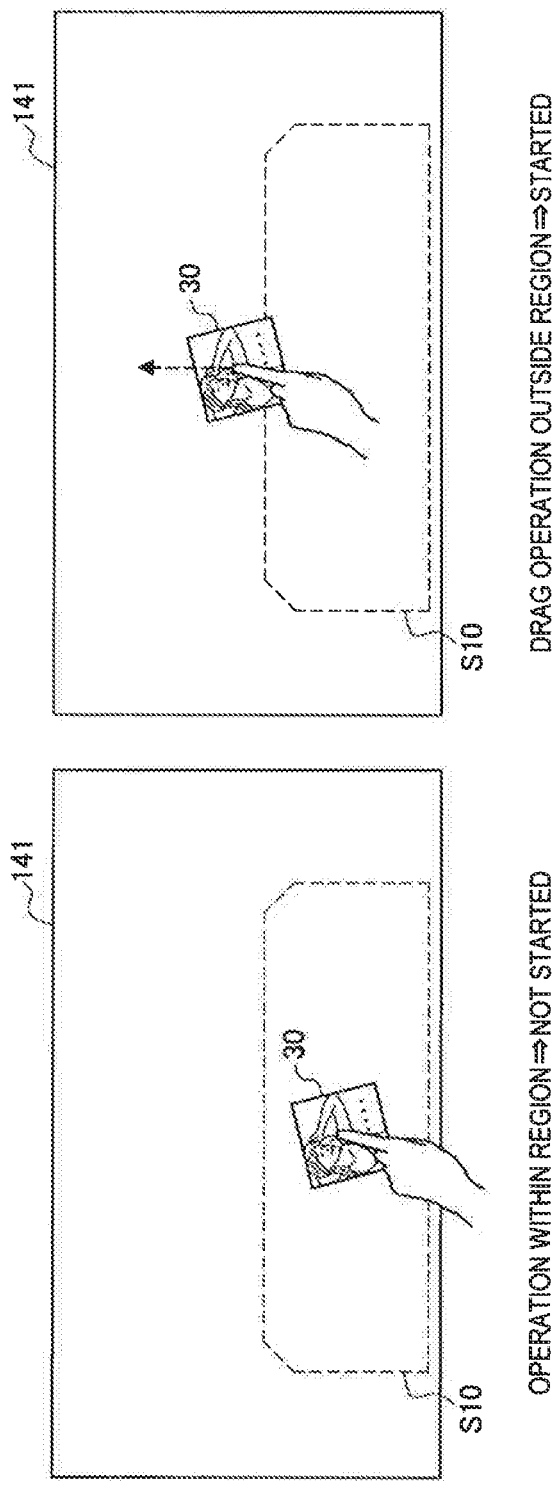

[Fig. 17]
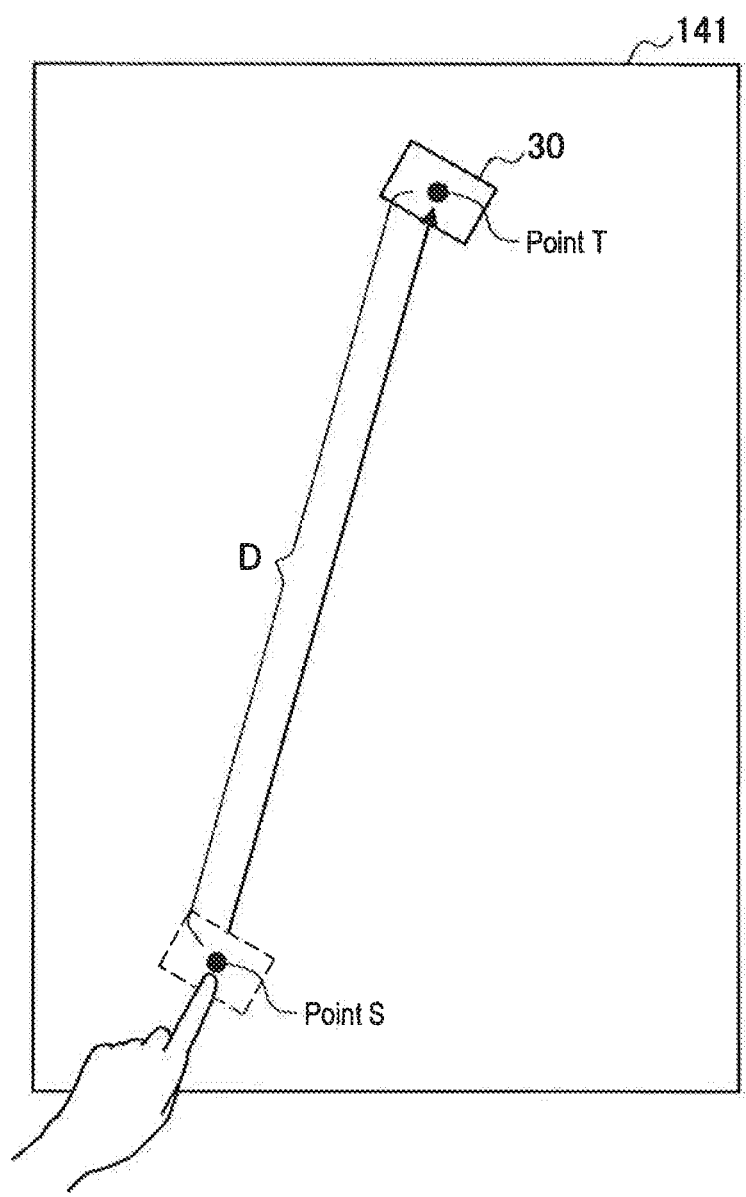
WITH NO OBSTACLE (REAL OBJECT) ⇒
GO STRAIGHT ALONG SHORTEST ROUTE

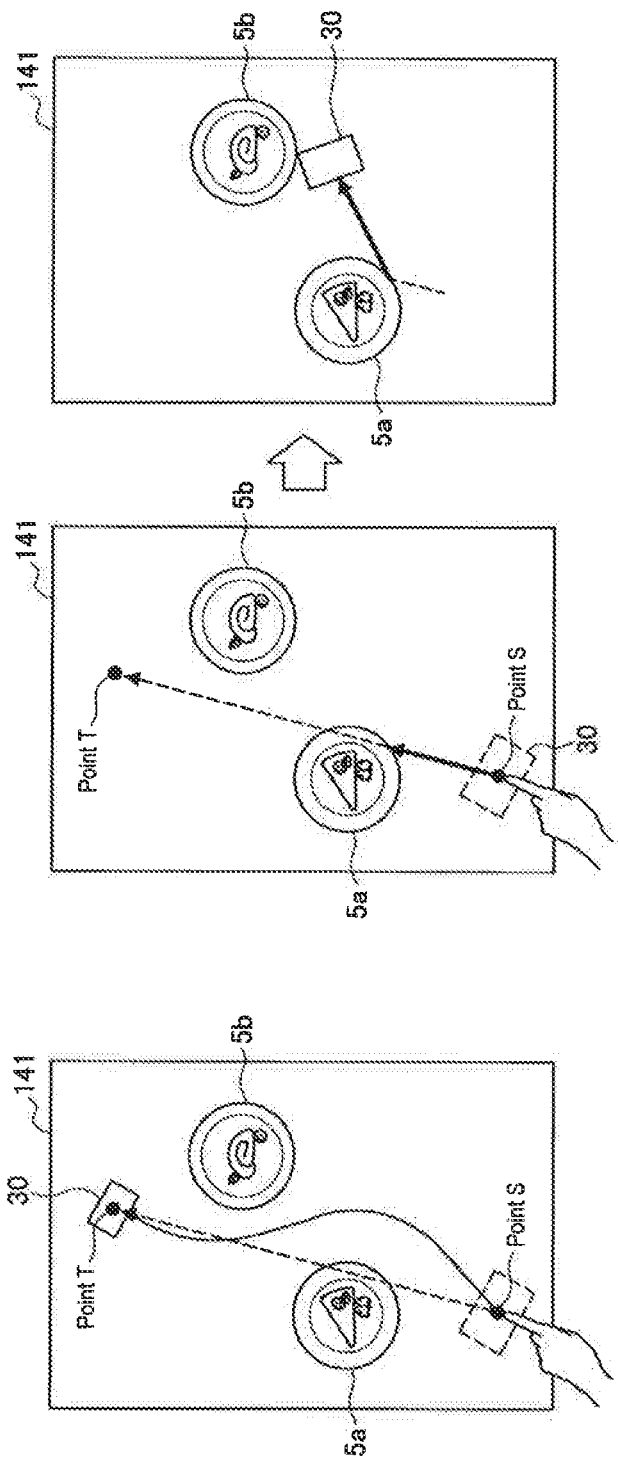
[Fig. 18]

[Fig. 19]
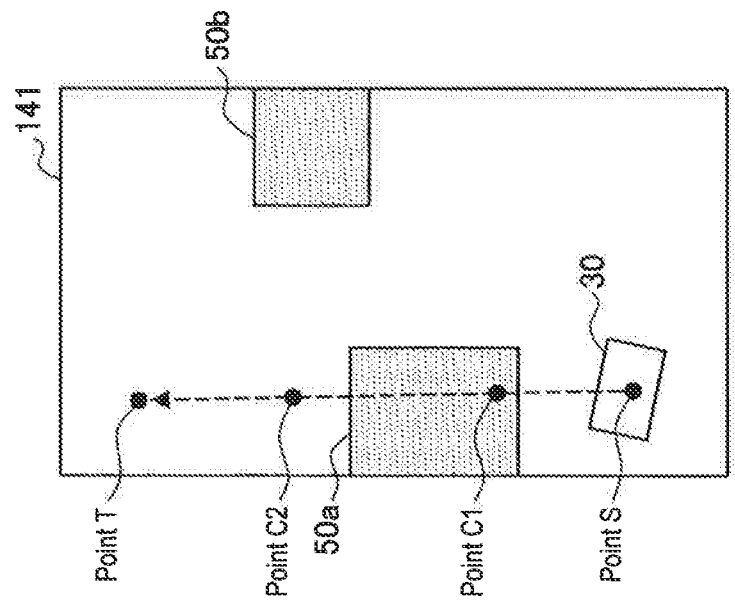
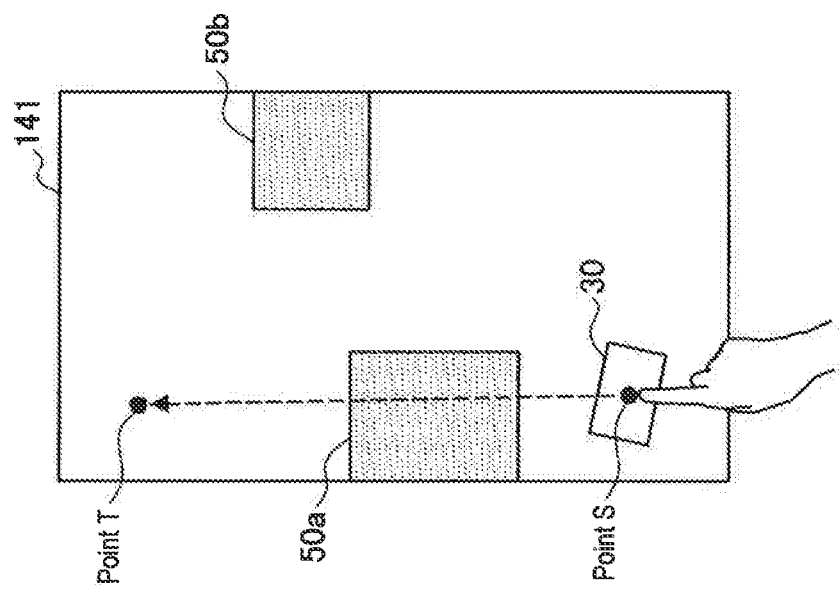

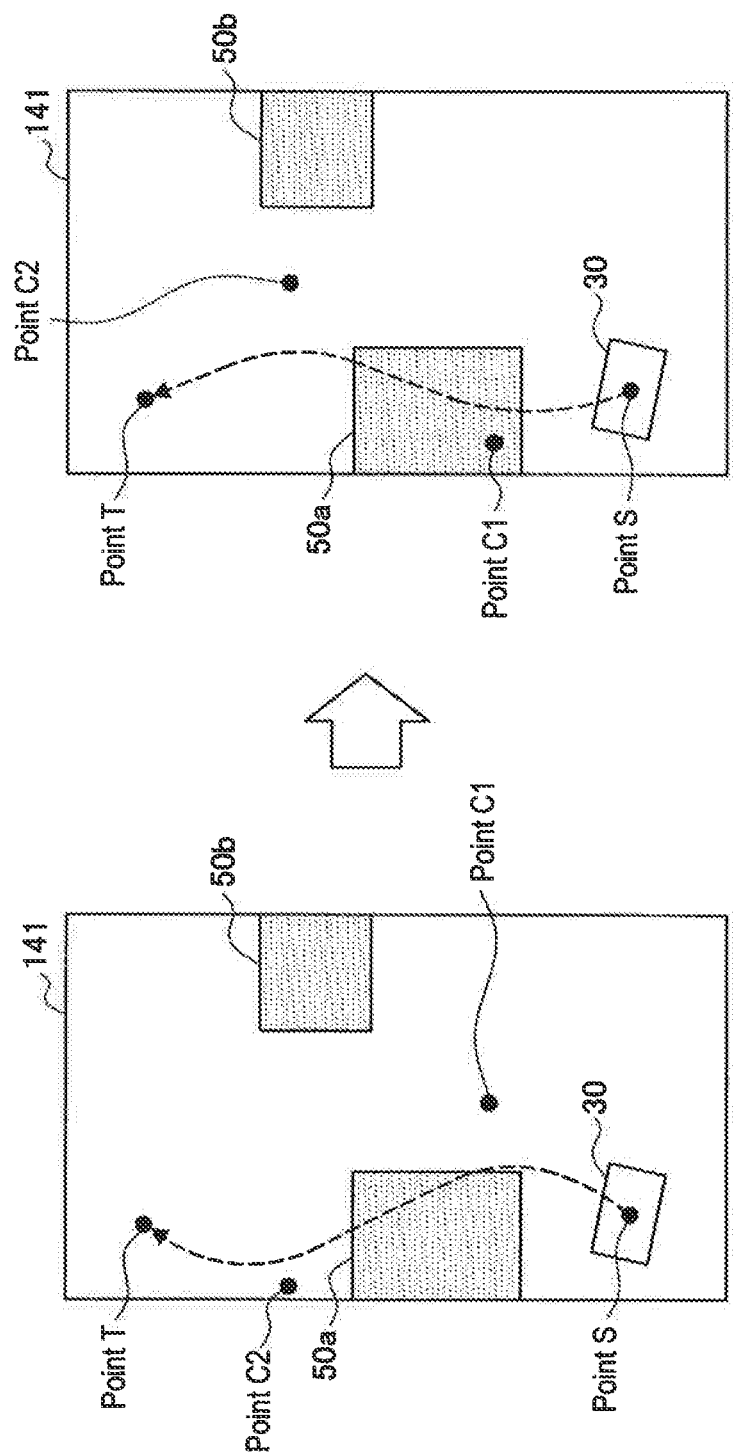
[Fig. 20]

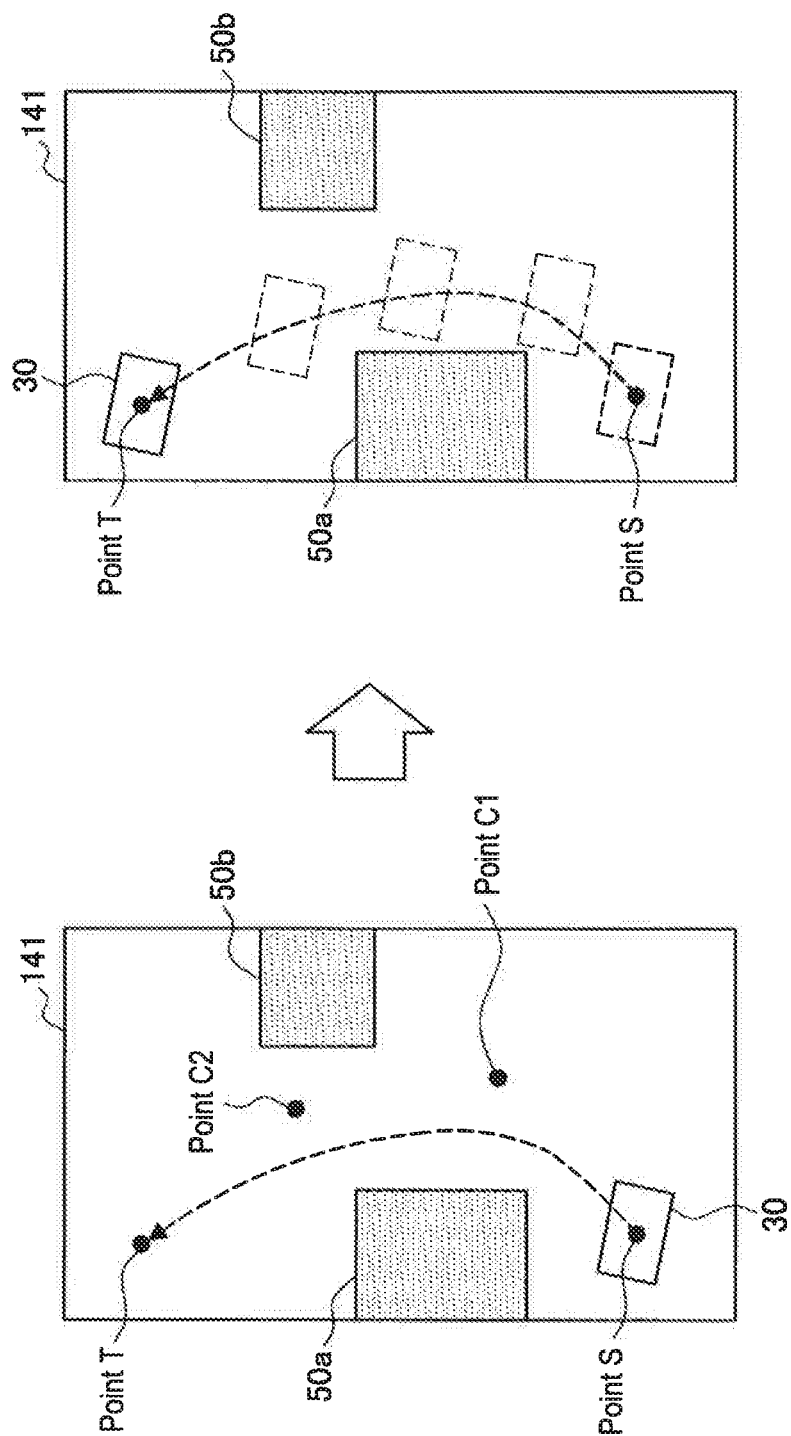
[Fig. 21]

[Fig. 22]
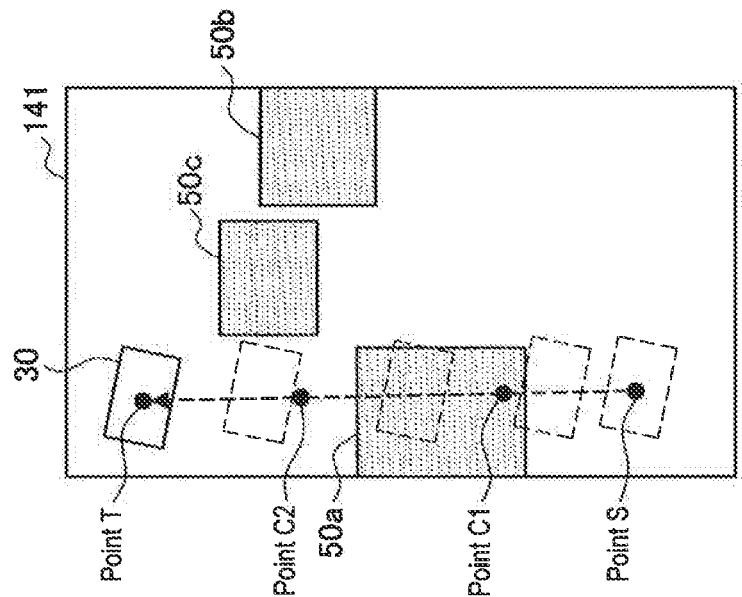
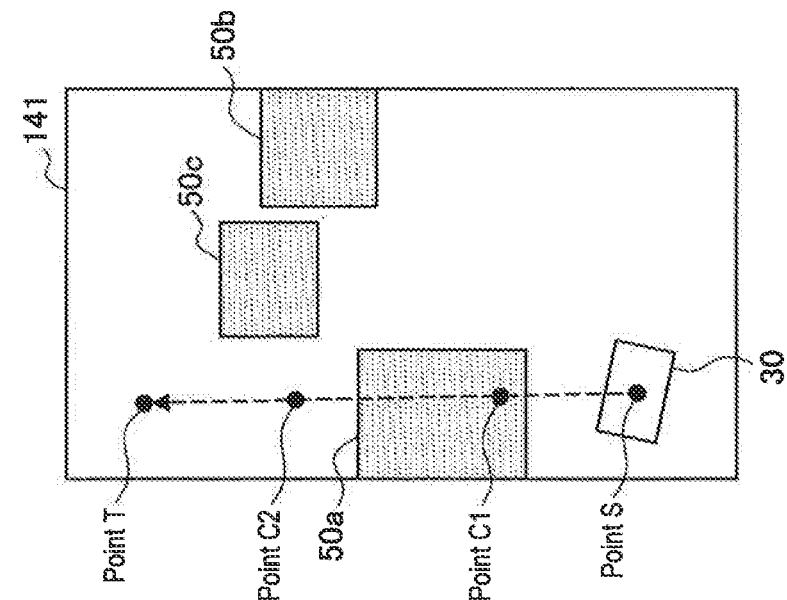

[Fig. 23]
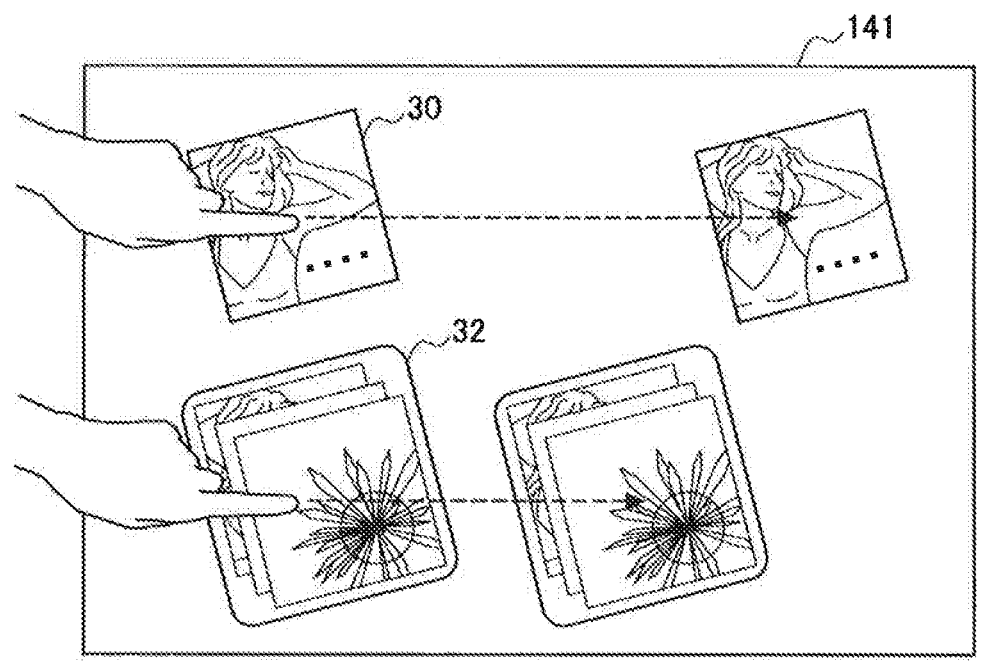
SMALL NUMBER OF FILES ⇒ REDUCE FRICTION
LARGE NUMBER OF FILES ⇒ INCREASE FRICTION

[Fig. 24]
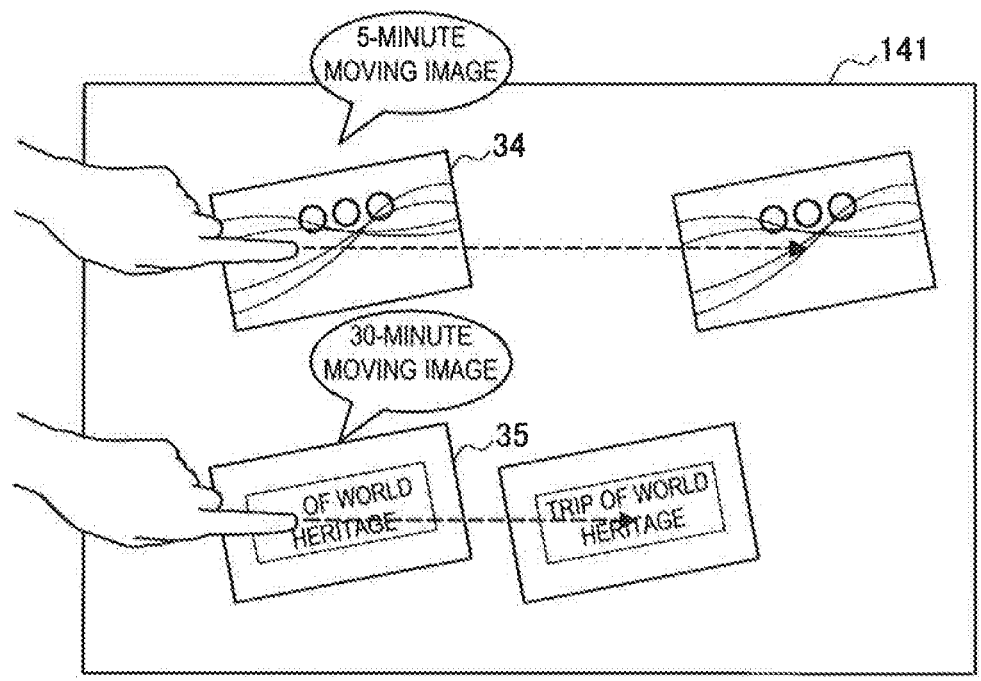
SMALL FILE SIZE ⇒ REDUCE FRICTION
LARGE FILE SIZE ⇒ INCREASE FRICTION

[Fig. 25]
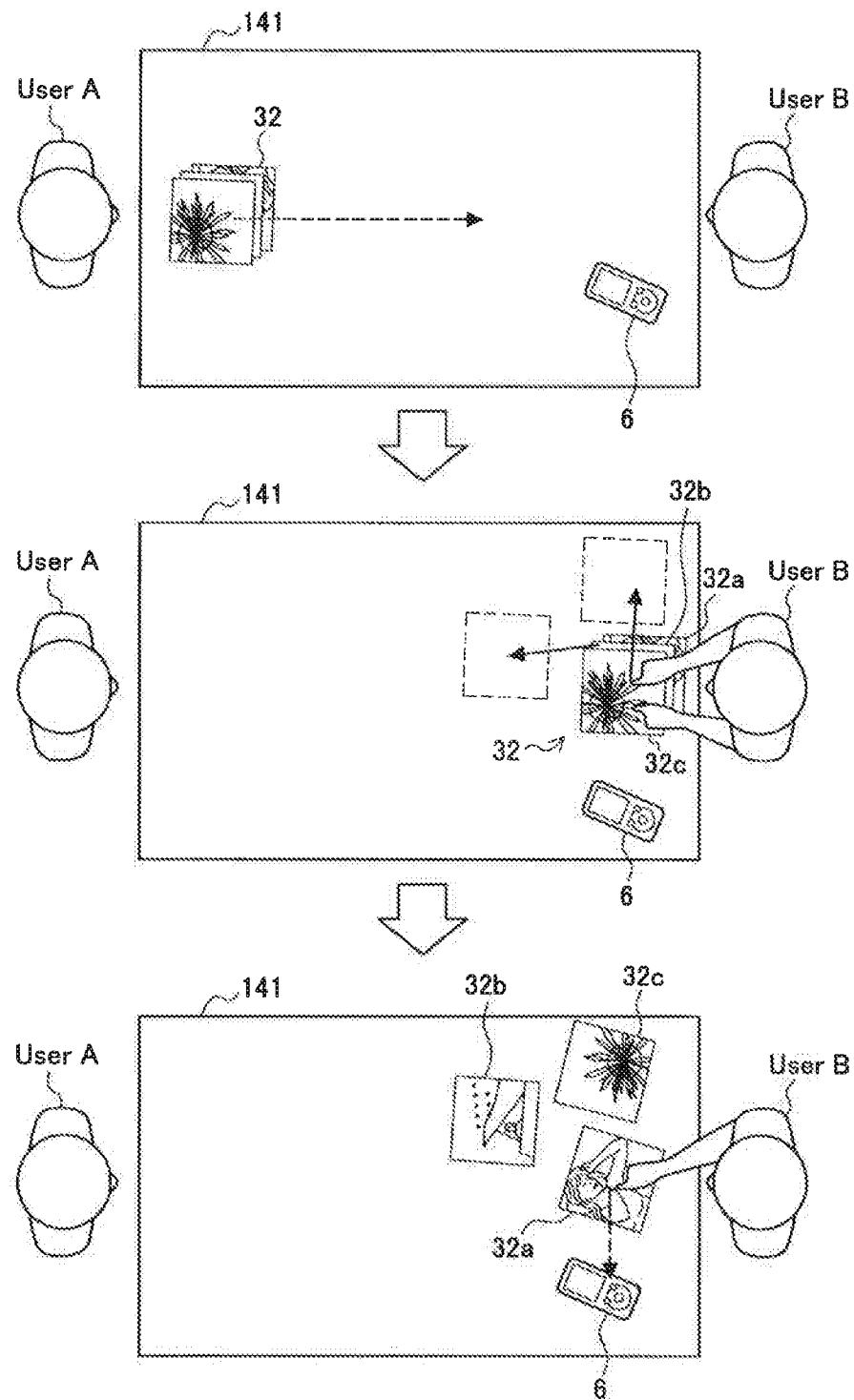

[Fig. 26]
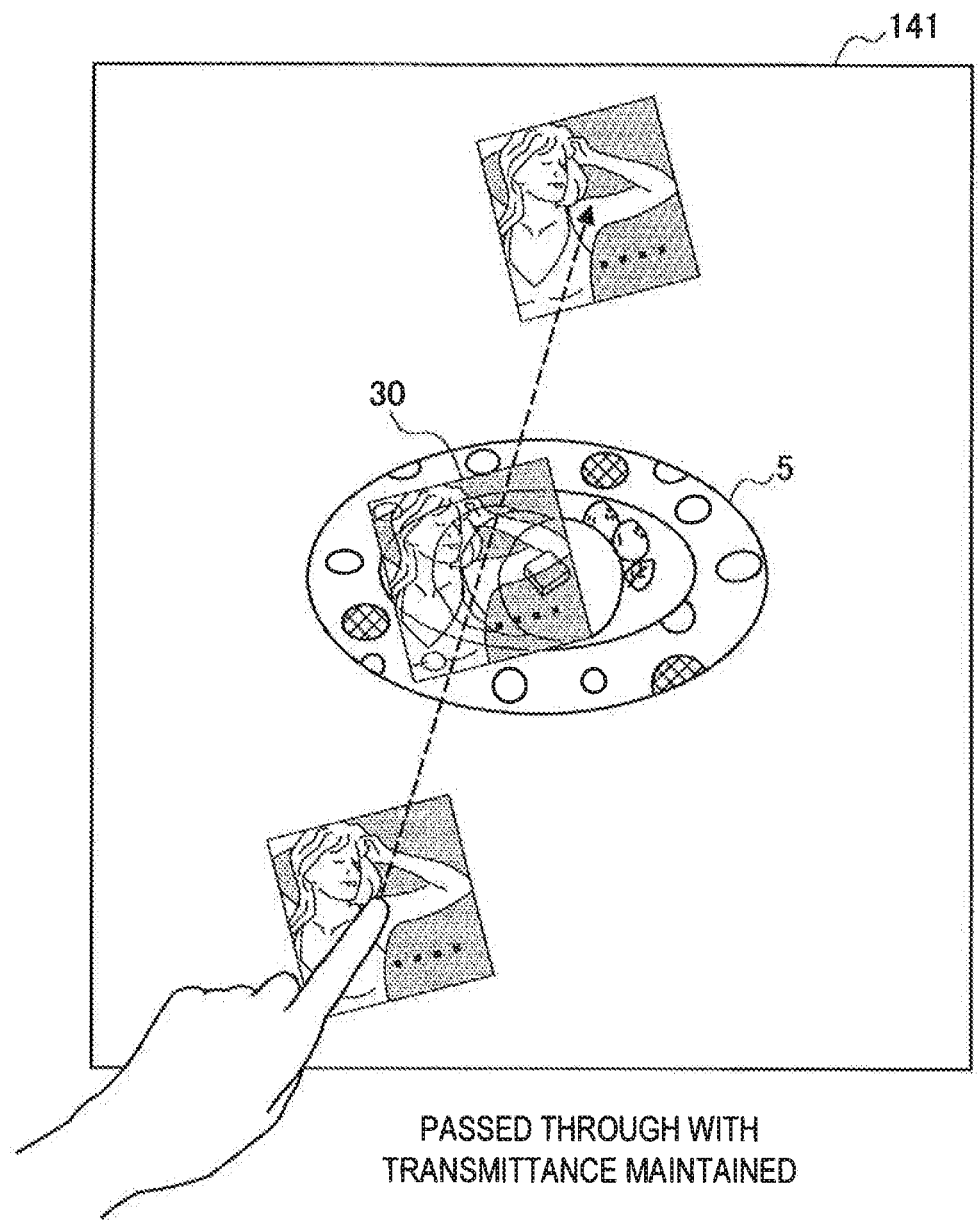

[Fig. 27]
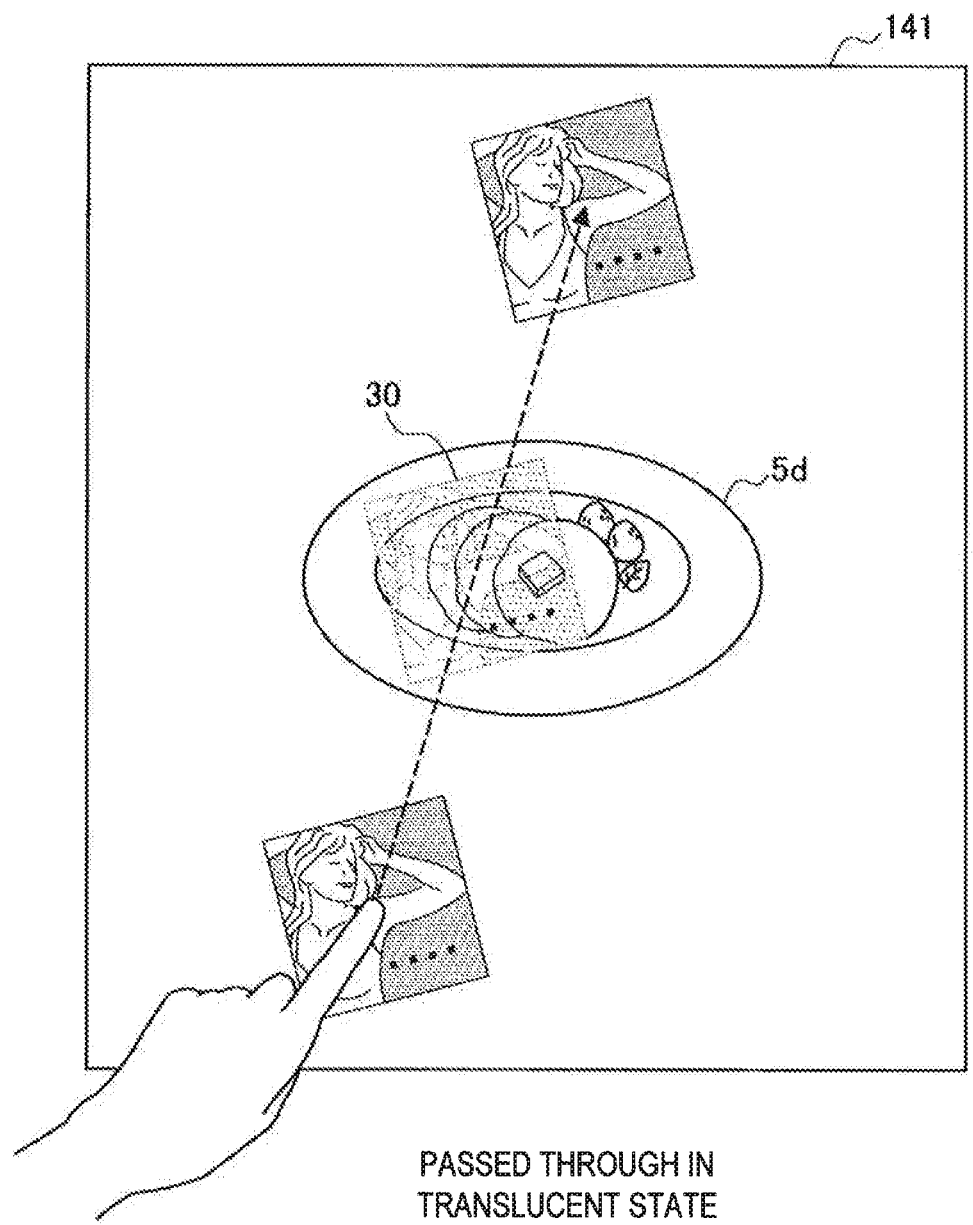

[Fig. 28]
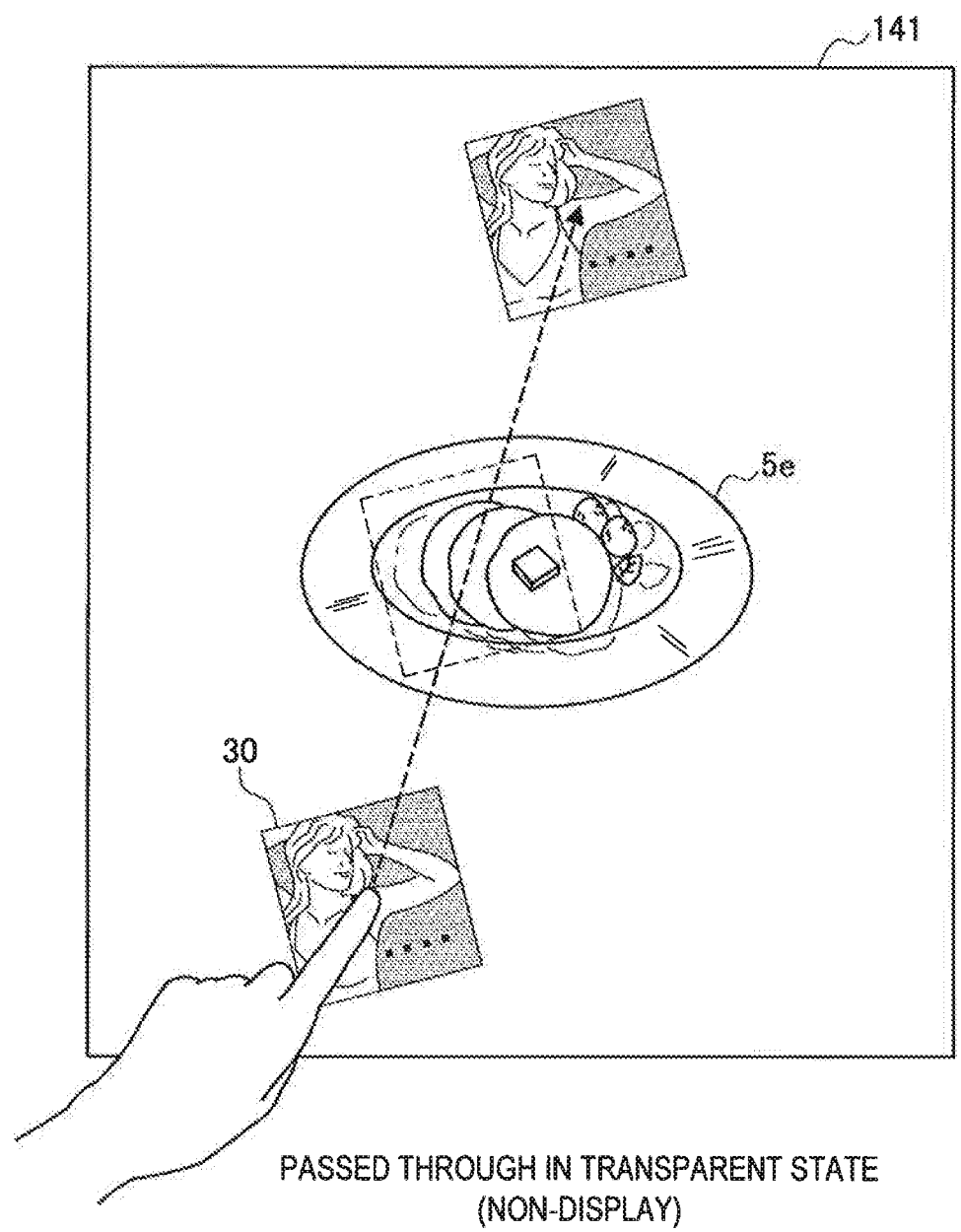
PASSED THROUGH IN TRANSPARENT STATE
(NON-DISPLAY)

[Fig. 29]
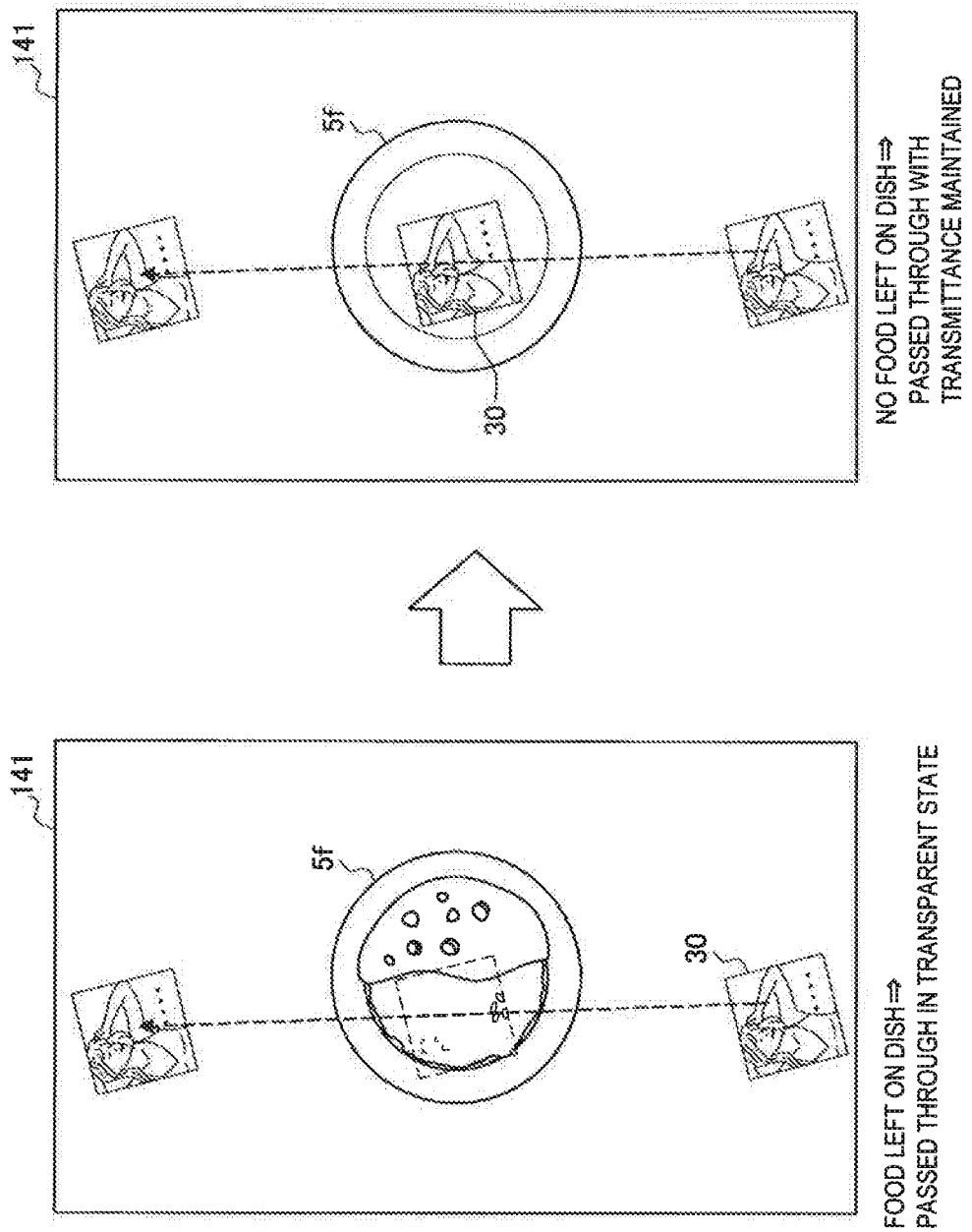

[Fig. 30]
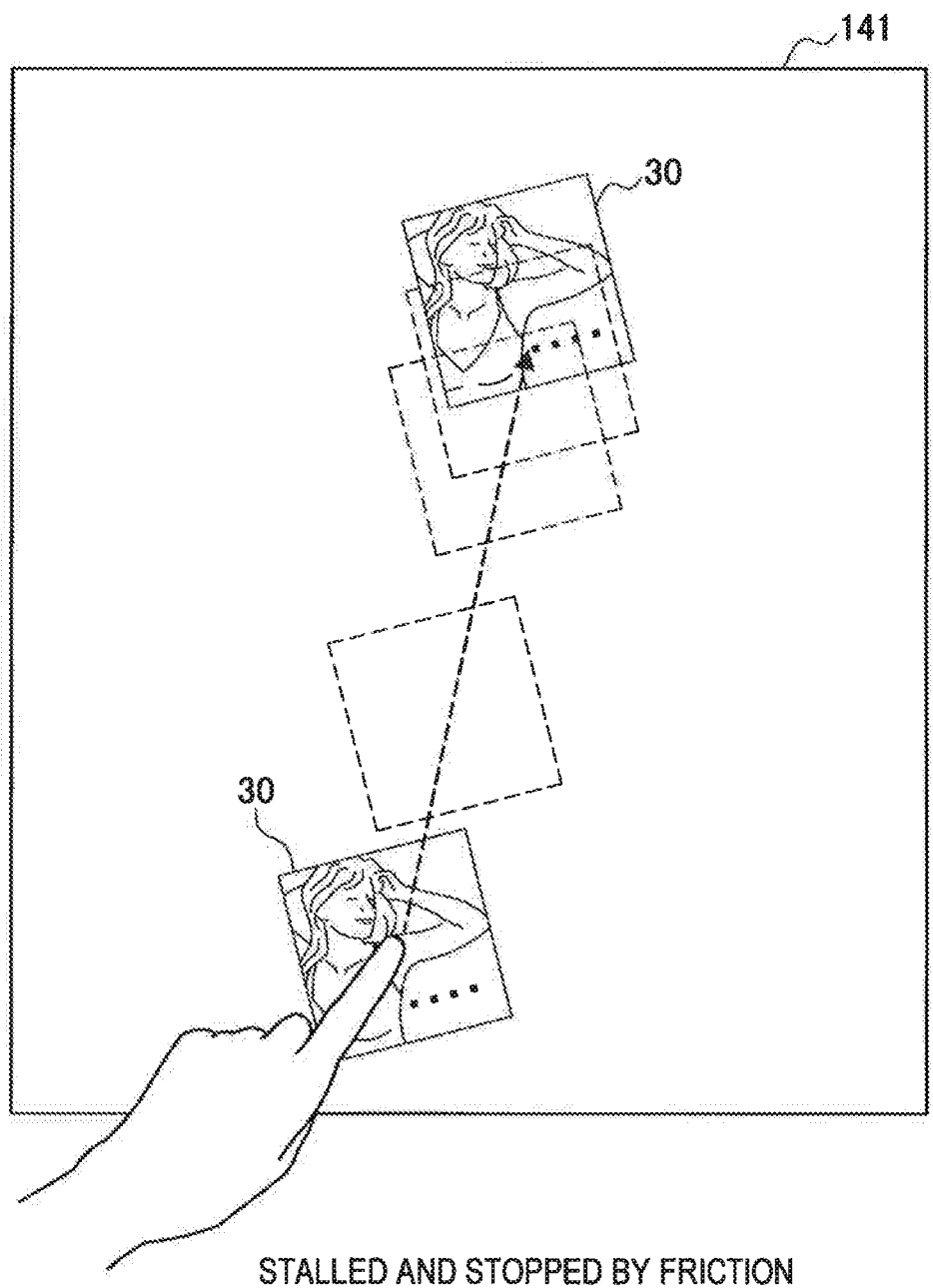
STALLED AND STOPPED BY FRICTION

[Fig. 31]
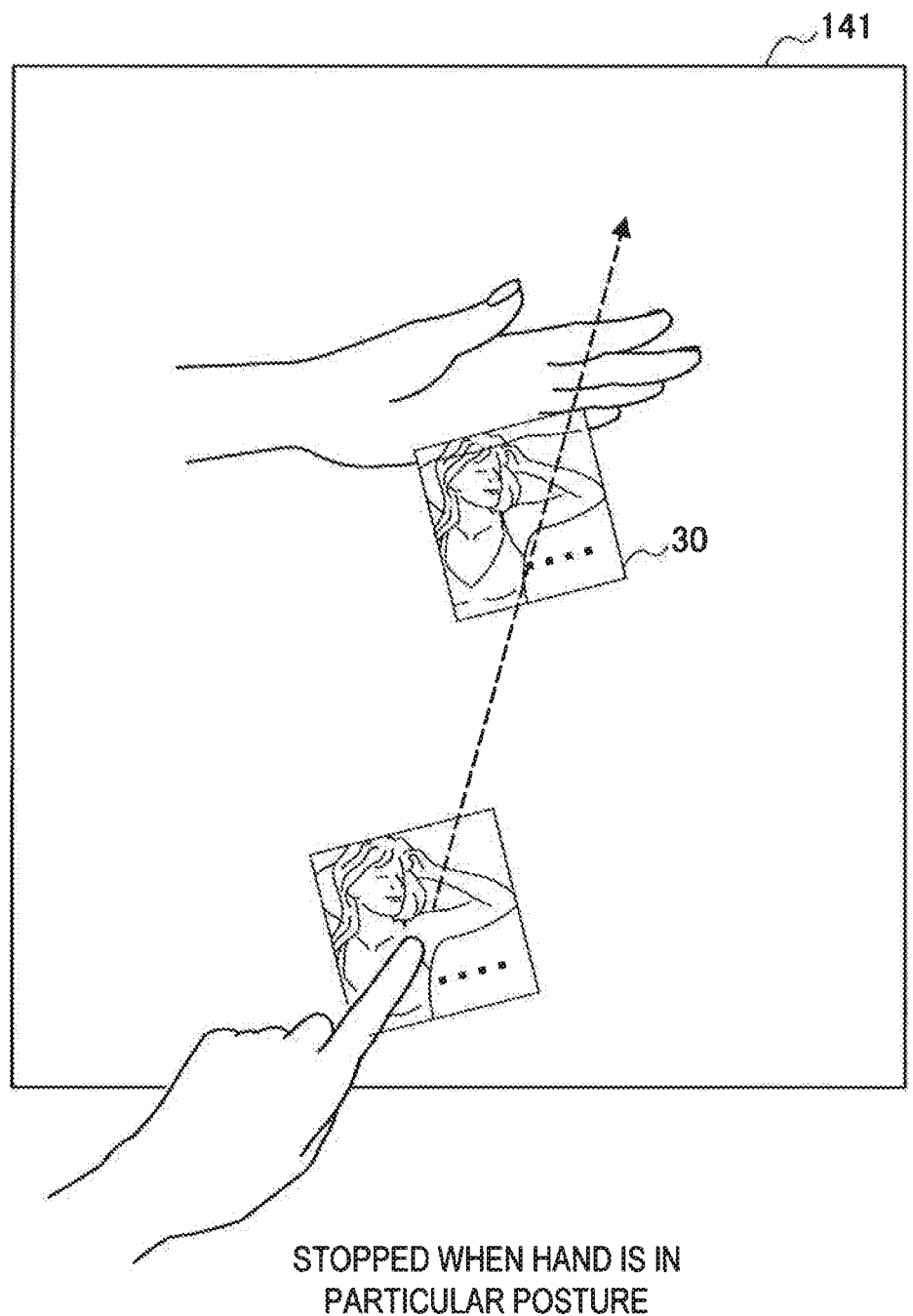

[Fig. 32]
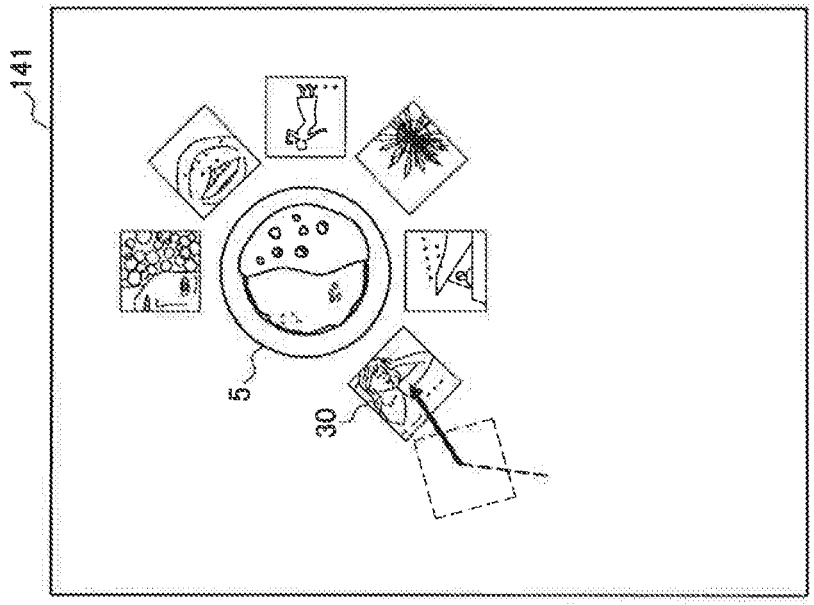
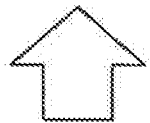
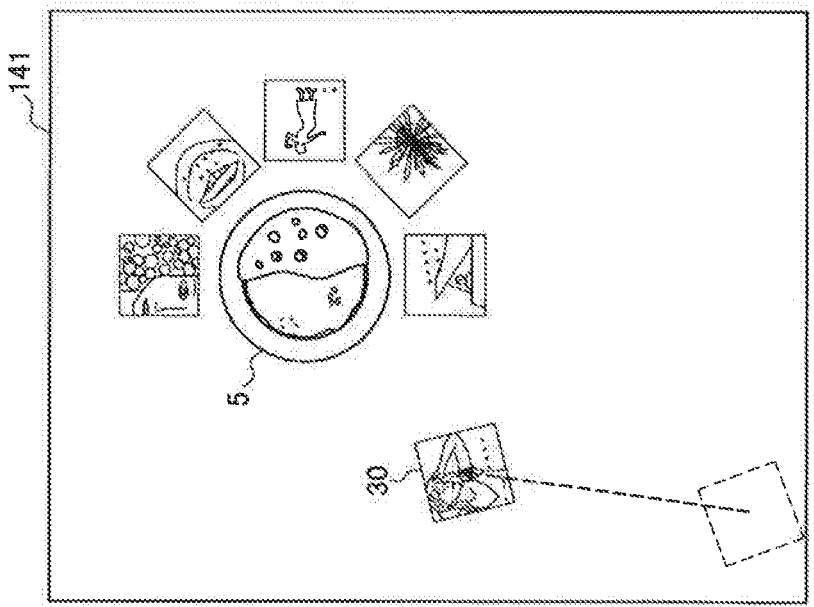

[Fig. 33]
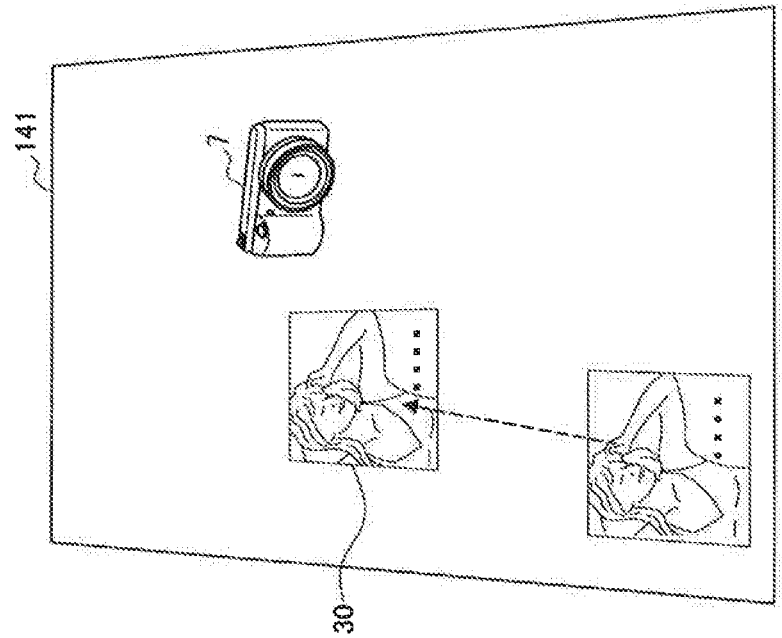
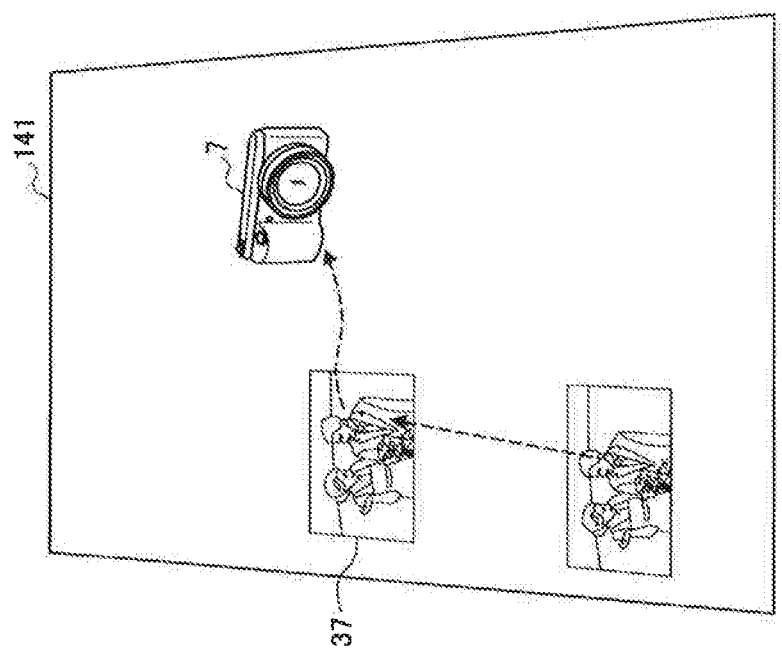

[Fig. 34]
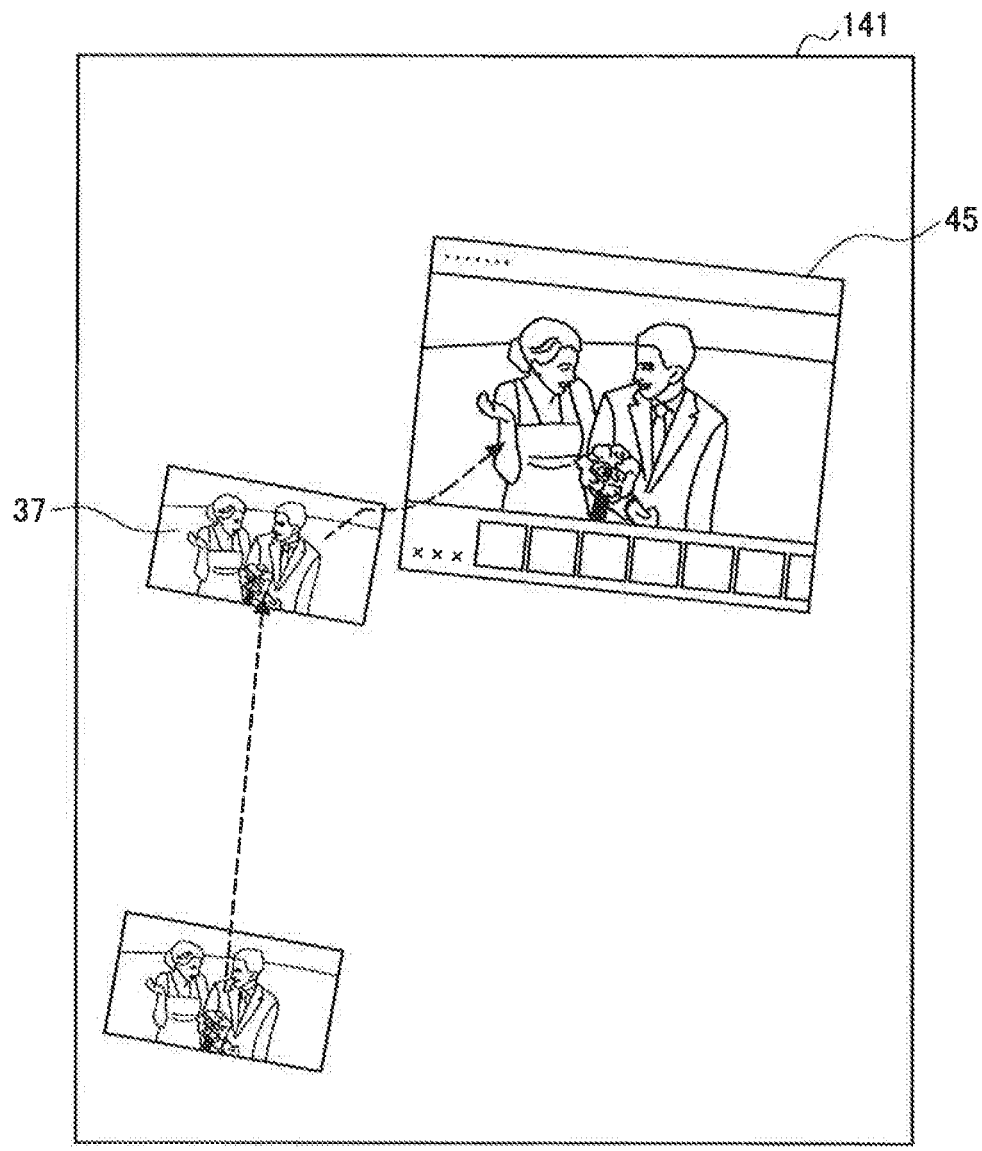

[Fig. 35]
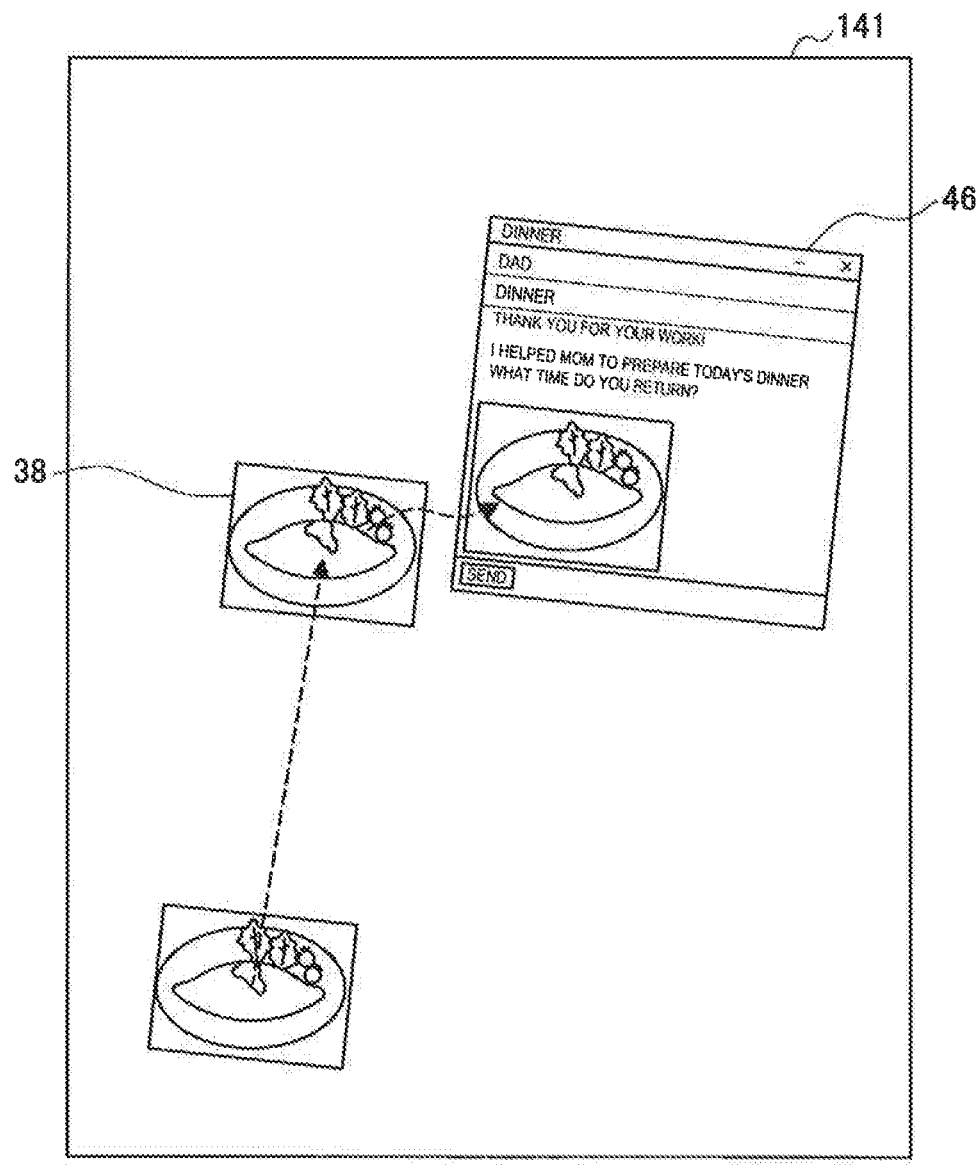

[Fig. 36]
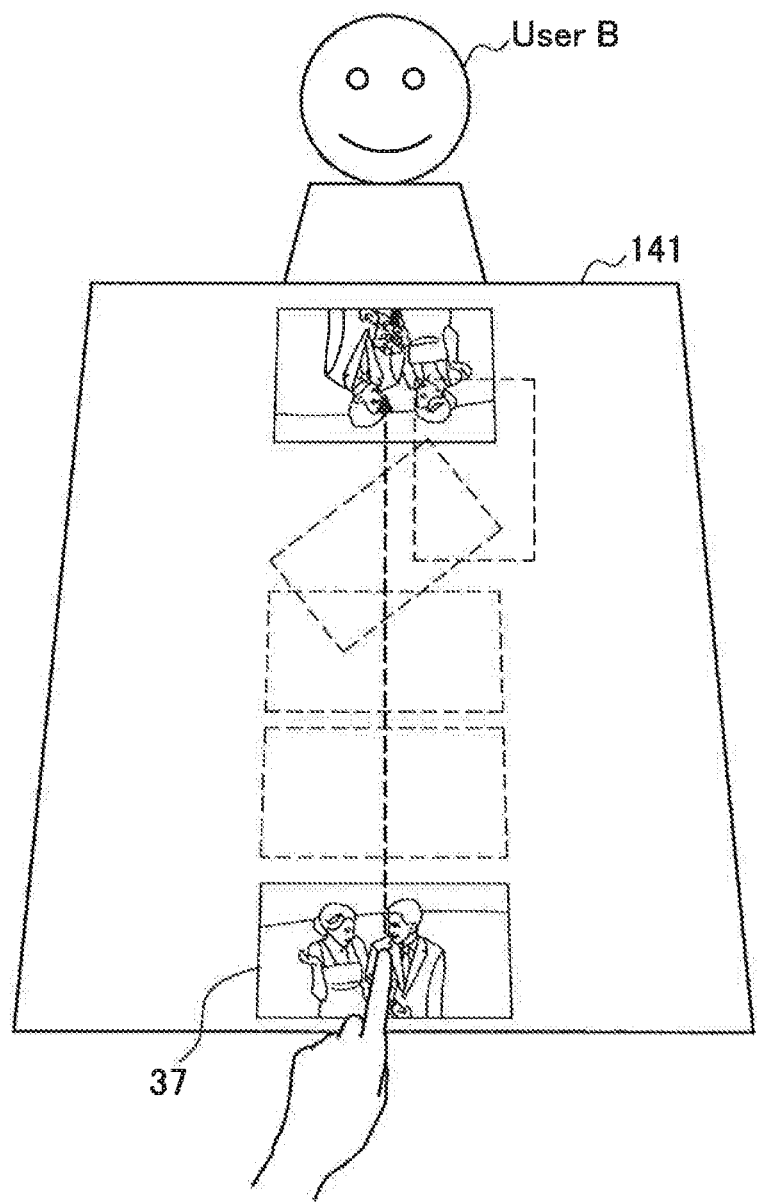
ROTATE IN DIRECTION EASY TO VIEW BY OPPONENT

[Fig. 37]
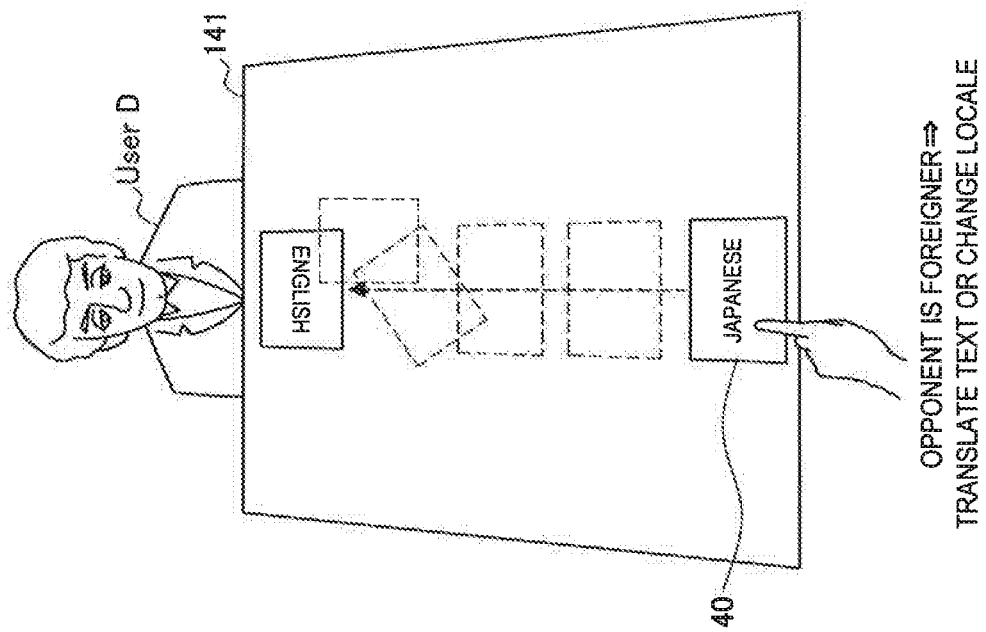
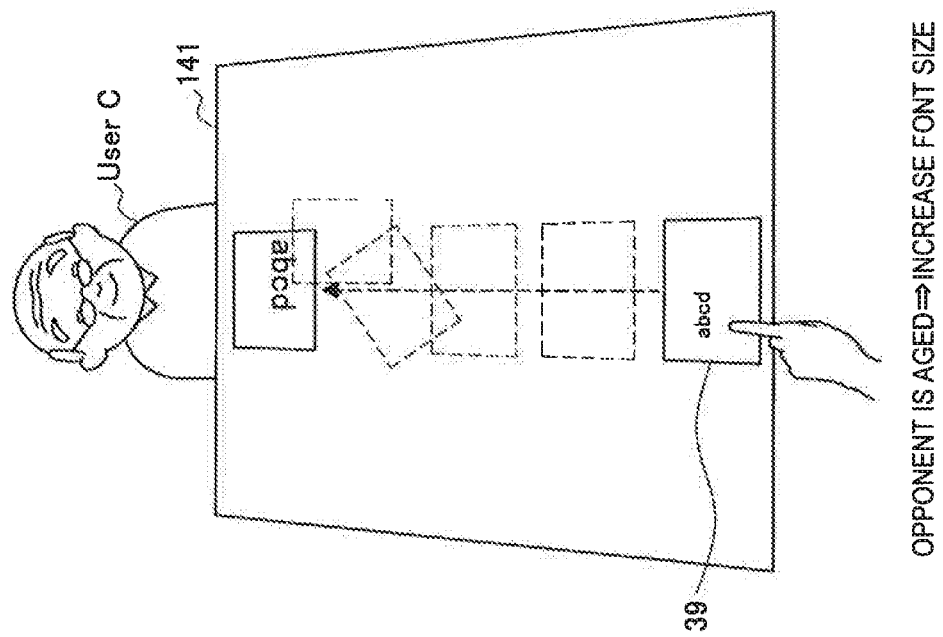

[Fig. 38]
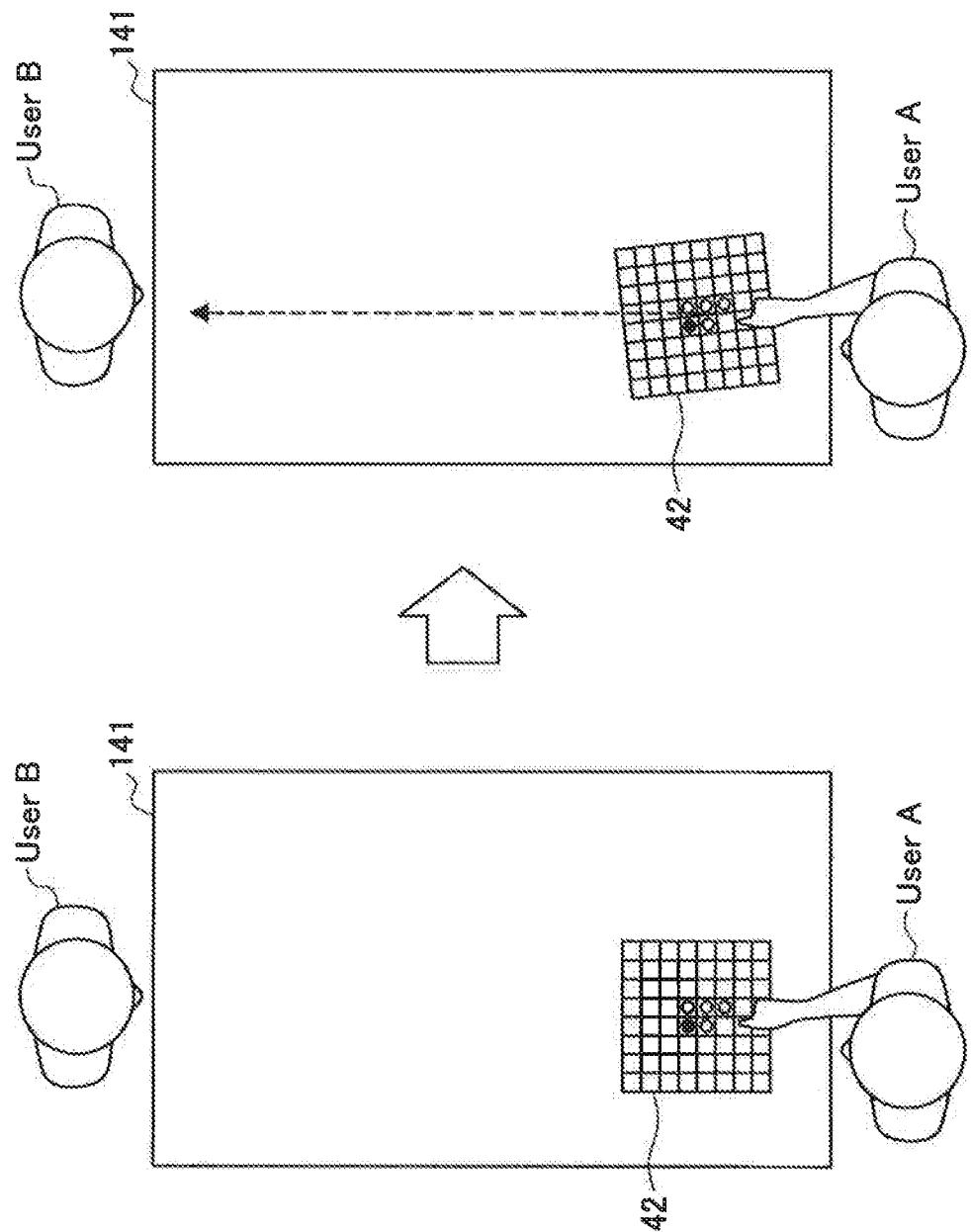

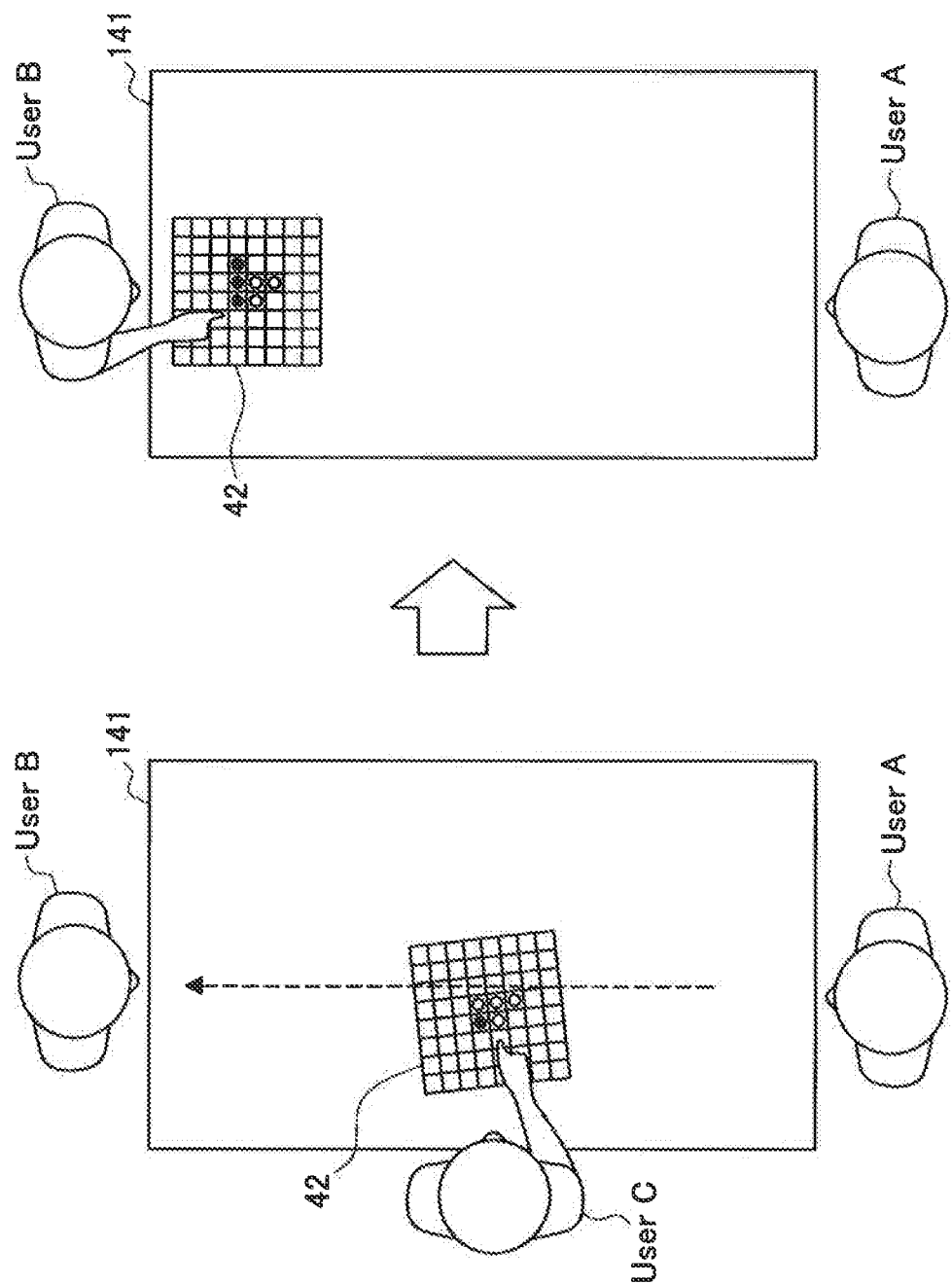
[Fig. 39]

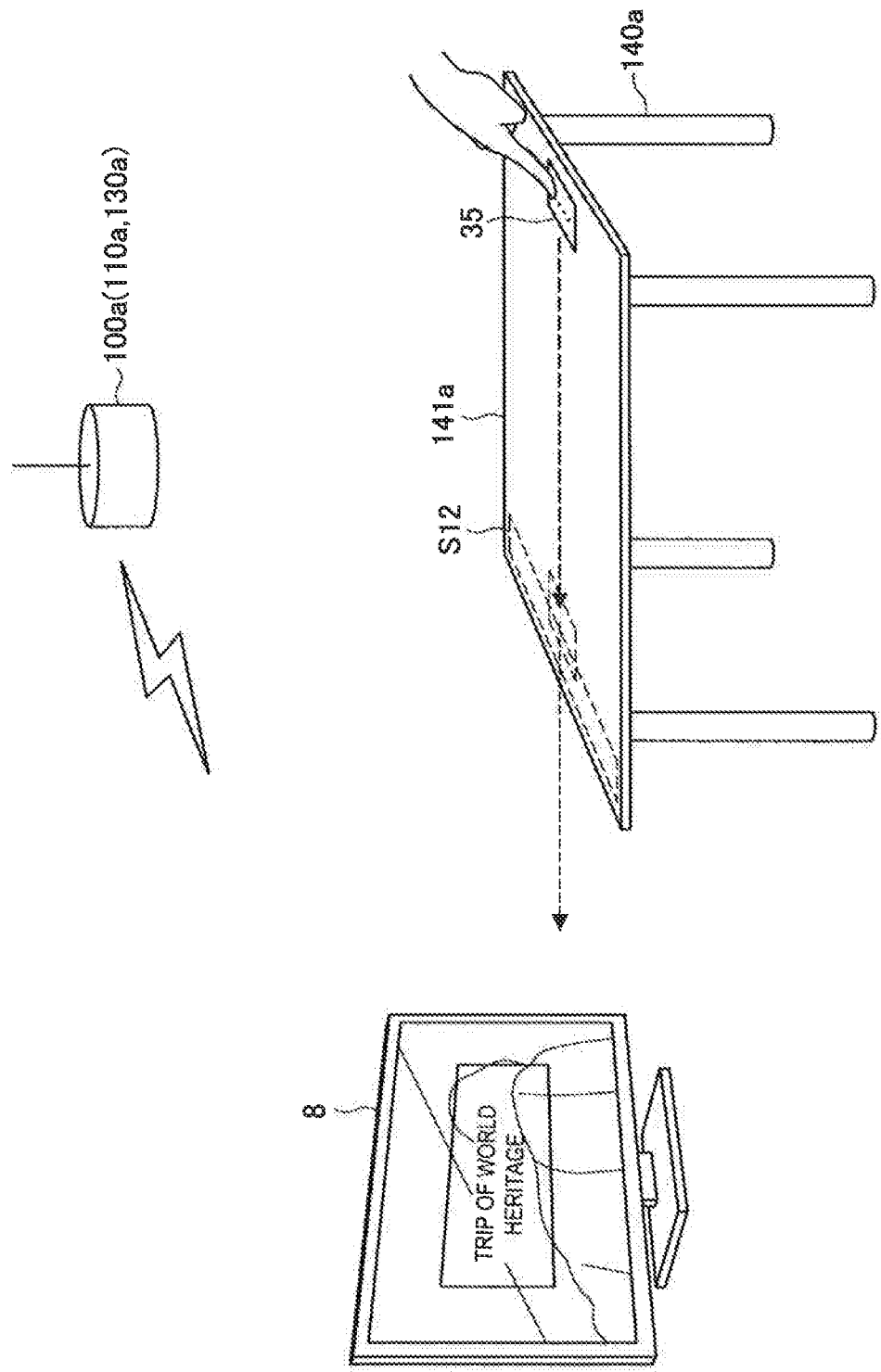
[Fig. 40]

INFORMATION PROCESSING APPARATUS, CONTROL METHOD, AND PROGRAM

CROSS REFERENCE TO RELATED APPLICATIONS

This application is a National Stage Patent Application of PCT International Patent Application PCT/JP2015/004276 filed Aug. 25, 2015 under 35 U.S.C. § 371, which claims the benefit of Japanese Priority Patent Application JP 2014-177929 filed Sep. 2, 2014, the entire contents of which are incorporated herein by reference.

TECHNICAL FIELD

The present disclosure relates to an information processing apparatus, a control method, and a program.

BACKGROUND ART

Devices for displaying various types of information by an operation on a touch panel provided in a smartphone, tablet terminal, and other devices are widely used. The tablet terminal with a large screen enables a way to achieve simultaneous operation by multiple users to be considered.

An operation on a touch panel is performed using a touch pen, a person's finger, or other object. Specifically, a touch pen or the like may be used to move or tap an icon displayed on a screen by touching the screen. An example of a way to perform operations on a touch panel is disclosed in PTL 1. PTL 1 discloses a technique for detecting the moving direction and speed of an icon operated by a touch pen or the like, and for shifting the icon further by a predetermined distance in the moving direction when a moving speed at the time of removing the touch pen or the like from the icon is greater than or equal to a predetermined speed.

A display device with a large screen, which is designed for allowing multiple users to perform simultaneous operations or viewing, includes a projector or a wall-mounted display. In recent years, a display system, which makes possible for multiple user to perform simultaneous operations or viewing by projecting an image onto a projection surface other than a screen, such as a tabletop, a ceiling, and a wall, has been widely used. Such a display system may detect an operation on displayed information (hereinafter referred to as "virtual object") using an imaging device or a touch panel, and may control display thereof depending on an operation input.

CITATION LIST

Patent Literature

[PTL 1]
JP H06-044001A

SUMMARY

Technical Problem

Unlike normal display screens, real objects such as cups and dishes are assumed to be placed on the tabletop, but the display control depending on the circumstances in which the real objects are placed has not been addressed in the related art.

The present disclosure provides an information processing apparatus, control method, and program, capable of displaying information in a more appropriate and efficient by controlling movement of a displayed virtual object depending on a positional relationship between the virtual object and a real object.

Solution to Problem

According to an embodiment of the present disclosure, there is proposed an information processing apparatus including circuitry configured to initiate display of a virtual object, based on a gesture operation, starting from a point of origin and moving towards a target point; and continue to display the virtual object in display motion after the gesture operation, wherein a path of travel of the virtual object or a display characteristic of the virtual object is determined based on a positional relationship between the virtual object and another object that is a real object located in proximity to the path of travel of the virtual object.

According to an embodiment of the present disclosure, there is proposed an information processing method including displaying a virtual object, based on a gesture operation, starting from a point of origin and moving towards a target point; and continuing to display the virtual object in display motion after the gesture operation, wherein a path of travel of the virtual object or a display characteristic of the virtual object is determined based on a positional relationship between the virtual object and another object that is a real object located in proximity to the path of travel of the virtual object.

According to an embodiment of the present disclosure, there is proposed a non-transitory computer-readable medium having embodied thereon a program, which when executed by a computer causes the computer to execute an information processing method, the method including displaying a virtual object, based on a gesture operation, starting from a point of origin and moving towards a target point; and continuing to display the virtual object in display motion after the gesture operation, wherein a path of travel of the virtual object or a display characteristic of the virtual object is determined based on a positional relationship between the virtual object and another object that is a real object located in proximity to the path of travel of the virtual object.

Advantageous Effects of Invention

According to one or more embodiments of the present disclosure described above, it is possible to display information in a more appropriate and efficient by controlling the movement of a displayed virtual object depending on a positional relationship between the virtual object and a real object.

Note that the effects described above are not necessarily limited, and along with or instead of the effects, any effect that is desired to be introduced in the present specification or other effects that can be expected from the present specification may be exhibited.

BRIEF DESCRIPTION OF DRAWINGS

FIG. 1 is a diagram illustrated to describe an exemplary configuration of an information processing system according to an embodiment of the present disclosure.

FIG. 2 is a diagram illustrated to describe another exemplary configuration of the information processing system according to an embodiment of the present disclosure.

FIG. 3 is a diagram illustrated to describe another exemplary configuration of the information processing system according to an embodiment of the present disclosure.

FIG. 4 is a diagram illustrating an example of content to be displayed.

FIG. 5 is a diagram illustrating an example of transferring and displaying a content item from a smartphone.

FIG. 6 is a diagram illustrating an example of transferring and displaying a content item from a smartphone.

FIG. 7 is a diagram illustrating an example of transferring and displaying a content item from a smartphone.

FIG. 8 is a diagram illustrating an example of operating a transferred content item.

FIG. 9 is a diagram illustrating an example of operating the movement of a transferred content item.

FIG. 10 is a diagram illustrating an example of operating the movement of a transferred content item.

FIG. 11 is a diagram illustrating an example of operating the movement of a transferred content item.

FIG. 12 is a diagram illustrating an example of operating a transferred content item.

FIG. 13 is a diagram illustrated to describe an exemplary configuration of an information processing apparatus according to an embodiment of the present disclosure.

FIG. 14 is a flowchart illustrating a display control process performed by the information processing system according to an embodiment of the present disclosure.

FIG. 15 is a diagram illustrated to describe a first start condition of the information processing system according to an embodiment of the present disclosure.

FIG. 16 is a diagram illustrated to describe a second start condition of the information processing system according to an embodiment of the present disclosure.

FIG. 17 is a diagram illustrated to describe how to acquire a first slide route according to an embodiment.

FIG. 18 is a diagram illustrated to describe how to acquire a second slide route according to an embodiment.

FIG. 19 is a diagram illustrated to describe how to search a route that circumvents an object in acquiring a second slide route according to an embodiment.

FIG. 20 is a diagram illustrated to describe how to search a route that circumvents an object in acquiring a second slide route according to an embodiment.

FIG. 21 is a diagram illustrated to describe how to search a route that circumvents an object in acquiring a second slide route according to an embodiment.

FIG. 22 is a diagram illustrated to describe how to search a route that circumvents an object in acquiring a second slide route according to an embodiment.

FIG. 23 is a diagram illustrated to describe how to acquire a first slide speed according to an embodiment.

FIG. 24 is a diagram illustrated to describe how to acquire a first slide speed according to an embodiment.

FIG. 25 is a diagram illustrated to describe advantageous effects obtained by the slide speed control depending on the capacity of content according to an embodiment.

FIG. 26 is a diagram illustrated to describe a first object proximity operation according to an embodiment.

FIG. 27 is a diagram illustrated to describe a second object proximity operation according to an embodiment.

FIG. 28 is a diagram illustrated to describe a third object proximity operation according to an embodiment.

FIG. 29 is a diagram illustrated to describe a fourth object proximity operation according to an embodiment.

FIG. 30 is a diagram illustrated to describe a first termination condition according to an embodiment.

FIG. 31 is a diagram illustrated to describe a second termination condition according to an embodiment.

FIG. 32 is a diagram illustrated to describe a first termination process according to an embodiment.

FIG. 33 is a diagram illustrated to describe another example of the first termination process according to an embodiment.

FIG. 34 is a diagram illustrated to describe a second termination process according to an embodiment.

FIG. 35 is a diagram illustrated to describe another example of the second termination process according to an embodiment.

FIG. 36 is a diagram illustrated to describe a third termination process according to an embodiment.

FIG. 37 is a diagram illustrated to describe another example of the third termination process according to an embodiment.

FIG. 38 is a diagram illustrated to describe how to disable the event for a content item during sliding.

FIG. 39 is a diagram illustrated to describe how to disable the event for a content item during sliding.

FIG. 40 is a diagram illustrated to describe a supplement to data transfer of the information processing system according to an embodiment.

DESCRIPTION OF EMBODIMENTS

Hereinafter, embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

The description is made in the following order.
1. Overview of Information Processing System according to Embodiment of present Disclosure
2. Basic Configuration
3. Operation Process
3-1. Start Condition
3-2. Slide Route and Slide Speed
3-3. Object Proximity Operation
3-4. Termination Condition
3-5. Termination Process
4. Supplement
5. Conclusion «1. Overview Of Information Processing System According to Embodiment of Present Disclosure»

An exemplary configuration of an information processing system according to an embodiment of the present disclosure will be described with reference to the drawings. FIG. 1 is a diagram illustrated to describe an exemplary configuration of an information processing system according to an embodiment of the present disclosure. An exemplary configuration of an information processing system according to an embodiment of the present disclosure will be described with reference to FIG. 1.

As shown in FIG. 1, the information processing system according to an embodiment of the present disclosure is configured to include an information processing apparatus $100a$ having an input function and an output function. In an example shown in FIG. 1, the information processing apparatus $100a$ displays information on the top surface $141a$ (tabletop) of a table $140a$ and allows the user to operate the information displayed on the top surface $141a$. A system of displaying information on the top surface 141a of the table 140a as shown in FIG. 1 is also referred to as "projection type" hereinafter.

The information processing apparatus 100a is provided over the table 140a, for example, in a suspended state from a ceiling. In other words, the information processing apparatus 100a is spaced apart from the table 140a on which information is displayed.

The information processing apparatus 100a has an input function (input unit 110a) for inputting particulars of an operation by the user on information displayed on the top surface 141a (tabletop), the shape of an object being placed on the table 140a, or other details. Examples of the input unit 110a of the information processing apparatus 100a include a camera for capturing the table 140a with one lens, a stereo camera capable of capturing the table 140a with two lenses and recording its depth directional information, or a microphone for picking up sound form the user's mouth and its surrounding environmental sound (simply referred to as "microphone").

When the camera for capturing the table 140a with one lens is used as the input unit 110a, the information processing apparatus 100a is allowed to analyze an image captured using the camera to detect an object placed on the table 140a. When the stereo camera is used as the input unit 110a, the stereo camera may include a visible light camera and an infrared camera. When the stereo camera is used, the information processing apparatus 100a is allowed to acquire depth information. The acquired depth information allows the information processing apparatus 100a to detect a person's finger or an object placed on the table 140a by distinguishing it from a pattern of the top surface or a tablecloth. The acquired depth information also allows the information processing apparatus 100a to detect a user's hand being in contact with or in proximity to the top surface 141a of the table 140a or to detect the removal of the hand from the top surface 141a. In the following description, a contact of an operation body of the user such as finger with a surface on which information is displayed (here, the top surface 141a) or a proximity of the operating body, such as hand, to the surface is collectively referred to as "contact".

When a microphone is used as the input unit 110a, a microphone array may be used to pick up sound in a particular direction. The information processing apparatus 100a may adjust the sound pickup direction of the microphone array in any optional direction.

Although the following description is mainly focused on the case in which the operation performed by the user is detected from an image captured by the input unit 110a, the present disclosure is not limited to such an example. The operation performed by the user may be detected using a touch panel that is provided on the top surface 141a of the table 140a and is used to detect a contact with the user's finger or the like. The user's operation may include an operation using a stylus on a surface on which information is displayed and a gesture operation to the camera, in addition to that described above.

The information processing apparatus 100a has an output function (output unit 130a) for displaying information on the top surface 141a (tabletop) of the table 140a or outputting sound. Examples of the output unit 130a include a projector and a loudspeaker.

When a projector is used as the output unit 130a, the output unit 130a projects information onto the top surface 141a of the table 140a. When a loudspeaker is used as the output unit 130a, the output unit 130a outputs sound based on a sound signal. One or more loudspeakers may be provided. When a plurality of loudspeakers are used as the output unit 130a, the information processing apparatus 100a is allowed to define which loudspeaker is used to output sound or adjust the sound output direction.

When the information processing apparatus 100a is the projection type as shown in FIG. 1, the output unit 130a may be provided with lighting equipment. When the lighting equipment is used, the information processing apparatus 100a is allowed to control on/off state of the lighting equipment based on the contents of information inputted by the input unit 110.

The user who uses the information processing system as shown in FIG. 1 is allowed to perform an operation on the information displayed on the top surface 141a of the table 140a by means of the output function (output unit 130a) of the information processing apparatus 100a, with the user's finger placed on the top surface 141a.

The information processing apparatus 100a is allowed to be connected to other devices, which is not shown in FIG. 1. As an example, the information processing apparatus 100a is allowed to be connected to a mobile device carried by the user, such as a smartphone and a tablet terminal, directly by a wireless connection, or through a server or the like over a network.

The present disclosure is not limited to the embodiment of the information processing system shown in FIG. 1. FIGS. 2 and 3 are diagrams illustrated to describe another example of the information processing system according to an embodiment of the present disclosure.

FIG. 2 is a diagram illustrated to describe another exemplary configuration of the information processing system according to an embodiment of the present disclosure. In FIG. 2, an information processing apparatus 100b may project and display information from under a table 140b onto a top surface 141b of the table 140b. In the example shown in FIG. 2, the information processing apparatus 100b includes an output unit 130b that is implemented as a projector. In the information processing system shown in FIG. 2, the top surface 141b of the table 140b, which is used as a surface on which information is displayed, is formed of a transparent material such as glass plate and transparent plastic plate. A system of projecting information from under the table 140b and displaying information on the top surface 141b as shown in FIG. 2 is also referred to as "rear projection type" hereinafter. In the example shown in FIG. 2, the table 140b may include an input unit 110b provided on the top surface 141b. The input unit 110b is implemented by a touch panel and detects the user's operation on information displayed on the top surface 141b. The input unit 110b is not limited to the configuration in which it is provided on the top surface 141b. As an example, when the input unit 110b is implemented as a camera, the input unit 110b may be spaced apart from the table 140b under the table 140b, and the input unit 110b may be incorporated into the information processing apparatus 100b.

FIG. 3 is a diagram illustrated to describe another exemplary configuration of the information processing system according to an embodiment of the present disclosure. FIG. 3 illustrates an information processing apparatus 100c that is implemented by a touch panel display and is placed on a top surface 141c of a table 140c. In such a touch panel display, an input unit 11 0c and an output unit 130c may be incorporated into the touch panel display. In other words, in the information processing system shown in FIG. 3, a surface on which information is displayed is the touch panel display. A system of displaying information using the touch panel display placed on the top surface 141c as shown in FIG. 3 is also referred to as "flat arrangement display type". The information processing system shown in FIG. 3 includes a camera provided over the touch panel display for detecting the user's position.

The following description is made of the information processing apparatus 100a provided with the input unit 110a and the output unit 130a over the table 140a, that is, the configuration in which the input unit 110a and the output unit 130a are spaced apart from the surface on which information is displayed as shown in FIG. 1. In the following description, the information processing apparatus 100a, the input unit 110a, the output unit 130a, the table 140a, and the top surface 141a are respectively simply called as information processing apparatus 100, the input unit 110, the output unit 130, the table 140, and the top surface 141.

(Exemplary Display of Content)

An example of information displayed on the top surface 141 of the table 140 by the output unit 130 of the information processing apparatus 100 will be described.

The information processing apparatus 100 displays various types of information on the top surface 141 of the table 140 depending on the user's operation. Information to be displayed is acquired from a local storage of the information processing apparatus 100 or an external storage of an external device (smartphones, tablet terminals, servers, etc.). FIG. 4 is a diagram illustrating an example of content to be displayed. As shown in FIG. 4, various types of information capable of being operated by multiple users are displayed on the top surface 141. In the example shown in FIG. 4, a music video application window 20, a launcher view 22, a music application window 23 are displayed in proximity to the corresponding individual users. The launcher view 22 is displayed depending on a contact operation with an icon 21. When the user taps a desired icon on the launcher view 22 or drags out of the launcher view 22, an application corresponding to the selected icon is expanded and it is displayed like the application windows 20 and 23. Information outputted and displayed by the information processing apparatus 100 is not limited to the example shown in FIG. 4. The Information including, but not limited to, web browser, timer application, note application, calculator application, calendar application, media files (e.g., moving image file, music file, photograph file), and image data may be displayed.

Although the example shown in FIG. 4 describes the case in which an icon to be used is selected from the launcher view 22 and then the selected icon is expanded and displayed on the table, the present disclosure is not limited thereto. As an example, content transferred from the information processing apparatus placed on the table may be expanded and displayed on the table. A basic example of controlling display of content by the information processing system according to an embodiment of the present disclosure will be described with reference to FIGS. 5 to 12. FIGS. 5 to 7 are diagrams illustrating an example of transferring and displaying content from a smartphone. FIG. 8 is a diagram illustrating an example of operating the transferred content. FIG. 9 is a diagram illustrating an example of operating the movement of the transferred content. FIGS. 10 and 11 are diagrams illustrating an example of controlling the movement of the transferred content. FIG. 12 is a diagram illustrating an example of operating the transferred content.

As shown in FIG. 5, the user places a smartphone 1 in a predetermined region S1 on the top surface 141 of the table 140. In this case, by fixing the position of the region S1, the information processing apparatus 100 placed over the top surface 141 can eliminate the necessity to recognize the smartphone 1. The information processing apparatus 100 fixes the position of the region S1 corresponding to each seat at the table 140 without displaying the region S1 on the top surface 141, and thus the users only place their smartphones 1 on the top surface 141 in front of their respective seats. The information processing apparatus 100 may display the region S1 on the top surface 141 to prompt the user to place the information processing apparatus such as the smartphone 1 in the region S1 by means of displaying or sound output.

Then, the user taps a region S2 as shown in FIG. 6. In this time, the information processing apparatus 100 may allow the user to tap a region near the smartphone 1 without displaying the region S2 on the top surface 141. Alternatively, the information processing apparatus 100 may display the region S2 on the top surface 141 to prompt the user to tap the region S1 by means of displaying or sound output.

The information processing apparatus 100, when recognizing that the region S2 is tapped, is connected to the smartphone 1 placed on the region S1. The information processing apparatus 100 then extracts (receives) content from a local storage of the smartphone 1 and projects the content on the top surface 141 for display. In this time, the information processing apparatus 100 controls display of content in such a way that content is popped out from the smartphone 1 into the top surface 141 as shown in FIG. 7. A range to be projected (display region) onto the top surface 141 may be set as a range shown by a region S3, as an example.

An example of the content to be extracted includes a plurality of photograph content items captured/browsed in close proximity and a plurality of music content items acquired/viewed in close proximity. The information processing apparatus 100 controls a plurality of photograph content items of the extracted content items to be displayed on the left side of the smartphone 1 when viewed from the user and controls a plurality of music content items (jacket photograph image) to be displayed on the left side. The information processing apparatus 100 displays a plurality of content items to be overlapped with each other in such a way that at least a portion of the image may be visible as shown in FIG. 7.

As shown in FIGS. 8 to 12, the user is allowed to operate each of the content items displayed on the top surface 141 with the user's finger or the like in contact with the top surface 141. For example, as shown in FIG. 8, when a music content item 25 is selected by tapping on it, the selected music content item 25 is reproduced. Specifically, the information processing apparatus 100 recognizes a tap operation on the music content item 25 with the finger or the like and controls the selected music content item 25 to be outputted from a loudspeaker (including a loudspeaker provided in the information processing apparatus 100, a loudspeaker provided on the table 140, and a loudspeaker provided in its vicinity). This makes it possible for the user to reproduce the music being viewed while the user eats at the table 140.

If there is a photograph content item that the user wants to show an opponent, the user can passes the photograph content item on to the opponent. For example, when there is a photograph content item 26 which a user wants to show to an opposite user located at the position facing the user across the table 140, the user drags the photograph content item 26 to the opposite user with the user's finger in contact with the photograph content item 26, as shown in FIG. 9. In this state, the user performs a flick operation on the photograph content item 26 to be slid to the opposite user by giving momentum to it.

In this case, the information processing apparatus 100 detects a moving direction and a moving speed of the photograph content item 26 and controls display of the photograph content item 26 in such a way that the photograph content item 26 further slides in the moving direction by a predetermined distance depending on the moving speed (to allow an object to be moved without another user operation after the previous user operation, like an inertial movement). In this time, the information processing apparatus 100 basically moves the photograph content item 26 in a straight line from the position at which the flick operation is performed. When there is an obstacle on the straight line indicated by the dashed arrow as shown in FIG. 10, the information processing apparatus 100 moves it along a slide route that is a path circumventing the obstacle. As described above, in an embodiment, to display information on the top surface 141 of the table 140, in some cases, there is a real object, such as cups and dishes, placed on the top surface 141. In this case, the information processing apparatus 100 performs display control by sliding the photograph content item 26 to the opposite user along a route that circumvents dishes 5a and 5b, as indicated by solid arrows in FIG. 10.

When moving the photograph content item 26 is moved depending on the user's flick operation, the information processing apparatus 100 may change the direction of the photograph content item 26 into the direction that is easily viewed by the opposite user.

The opposite user can expand and browse the photograph content item 26 by tapping on it as shown in FIG. 12. In other words, after the photograph content item 26 stops its movement, the information processing apparatus 100 recognizes the operation by the opposite user on the photograph content item 26. Then, when a tap operation is performed, the information processing apparatus 100 controls the photograph content item 26 to be displayed in an enlarged form.

It is recognized that the display is terminated like when both users leave their seats carrying their smartphones 1, the information processing apparatus 100 switches scenes by fading out the content on the display surface (top surface 141).

«2. Basic Configuration»

An overview of the information processing system according to an embodiment of the present disclosure has been described above. Subsequently, the configuration of the information processing apparatus 100 that constitutes the information processing system according to an embodiment of the present disclosure will be described with reference to FIG. 13. FIG. 13 is a diagram illustrated to describe an exemplary configuration of the information processing apparatus 100 according to an embodiment of the present disclosure.

As shown in FIG. 13, the information processing apparatus 100 according to an embodiment of the present disclosure is configured to include an input unit 110, a controller 120, and an output unit 130.

The input unit 110 allows particulars of an operation on the information processing apparatus 100 by the user who uses the information processing apparatus 100 or the shape or the like of an object placed on a surface to which the output unit 130 outputs information (e.g., the top surface 141a of the table 140a shown in FIG. 1) to be inputted. An example of particulars of an operation on the information processing apparatus 100 by the user who uses the information processing apparatus 100 includes particulars of the operation on a GUI outputted on a display surface by the information processing apparatus 100. The particulars of an operation on the information processing apparatus 100 or information on the shape or the like of an object, which are inputted to the input unit 110, are sent to the controller 120.

When the information processing apparatus 100 is configured as a projection type, the input unit 110 may be configured as a camera including one lens, a stereo camera including two lenses, or a microphone.

The controller 120 controls each component of the information processing apparatus 100. For example, the controller 120 generates information that is to be outputted from the output unit 130 using information inputted to the input unit 110. As shown in FIG. 13, the controller 120 is configured to include a detection unit 121 and an output control unit 122. The detection unit 121 performs a process for detecting particulars of an operation on the information processing apparatus 100 by the user who uses the information processing apparatus 100, contents of information being outputted from the output unit 130, and the shape or the like of an object placed on a surface to which the output unit 130 outputs information (e.g., the top surface 141a of the table 140a shown in FIG. 1). The particulars detected by the detection unit 121 are sent to the output control unit 122. The output control unit 122 performs control for generating information to be outputted from the output unit 130 based on the particulars detected by the detection unit 121. More specifically, the output control unit 122 controls the moving speed and/or moving route of a virtual object, in accordance with the moving speed and/or moving route of the virtual object obtained based on the moving direction and/or moving speed of the user operation on information (virtual object) outputted from the output unit 130. The information generated by the output control unit 122 is sent to the output unit 130.

For example, when the information processing apparatus 100 is configured as a projection type shown in FIG. 1, a previous calibration for achieving matching between coordinates of a surface on which information is displayed and coordinates where an operating body such as the user's hand is in contact with the display surface may be performed. As a result, the detection unit 121 can detect which portion of the GUI is in contact with the operating body such as the user's hand. The output control unit 122 controls display of display information (virtual object) depending on the user's operation on a virtual object displayed on the display surface. Specifically, when the display information is moved by the flick operation, the output control unit 122 performs display control of information to be displayed depending on a positional relationship with a real object located near the moving route of the display information. The detailed display control will be described in more detail at the heading «3. Operation Process» described later.

The controller 120 may be configured to include a central processing unit (CPU), a read only memory (ROM), and a random access memory (RAM). When the controller 120 includes a CPU device or the like, such device may be composed of electronic circuits.

Although not shown in FIG. 13, the controller 120 may have a communication function for performing a wireless communication with other devices and a function for controlling the operation of other devices connected to the information processing apparatus 100, such as lighting equipment.

The controller 120 is configured to include a storage unit for storing content control information (so-called content control information database). The content control information may be particulars of inputted operation and information indicating what type of content control is performed on an object or the like placed on the table 140a. The controller 120 performs display control depending on information inputted from the input unit 110 by referring to the content control information stored in the storage unit.

The output unit 130 outputs information depending on information about particulars of the operation by the user who uses the information processing apparatus 100, contents of information being outputted from the output unit 130, or the shape or the like of an object placed on a surface to which the output unit 130 outputs information (e.g., the top surface 141a of the table 140a shown in FIG. 1), which are inputted by the input unit 110. The output unit 130 outputs information based on information generated by the output control unit 122. An example of the information outputted from the output unit 130 includes information displayed on the display surface, sound outputted from a loudspeaker (not shown), or the like.

The information processing apparatus 100 shown in FIG. 13 may be configured as a stand-alone device, or may be configured partially or entirely in a separate device. For example, among the exemplary configuration of the information processing apparatus 100 shown in FIG. 13, the controller 120 may be included in a device such as a server that is connected to the input unit 110 and the output unit 130 over a network or the like. When the controller 120 is included in the device such as a server, information from the input unit 110 is transmitted to the device such as a server through the network or the like. The controller 120 performs a process on the information from the input unit 120. Information to be outputted from the output unit 130 is sent from the device such as a server to the output unit 130 through the network or the like.

An exemplary configuration of the information processing apparatus 100 according to an embodiment of the present disclosure has been described with reference to FIG. 13. Subsequently, an information display example by the information processing apparatus 100 according to an embodiment of the present disclosure will be described.

«3. Operation Process»

The information processing system according to an embodiment is configured in such a way that multiple users may execute respective independent applications on the same screen, for example, displayed on the table 140a, as shown in FIGS. 4, 5 to 12. For example, a graphical user interface (GUI) of the applications shown in FIG. 4 is generated by the output control unit 122 and is outputted from the output unit 130.

The information processing system acquires operation particulars by the user on the GUI of the application outputted on an information display surface by the output unit 130 through the input unit 110. The information processing system allows the user to be in contact with the display surface with an operating body such as the user's hand or allows the operating body being in contact with the display surface to move on the display surface. Thus, the information processing system receives an operation on the GUI of the application outputted on the information display surface by the output unit 130.

An embodiment of the present disclosure particularly relates to an operation for moving a position at which the GUI is displayed among operations on the GUI of applications. As shown in FIGS. 1 to 3, for example, when information is displayed on the table 140a, in some cases, a real object such as cups or dishes is placed on the top surface 141a of the table 140a. Thus, the GUI may be moved by a predetermined distance depending on the moving speed on the straight line in the moving direction depending on the flick operation by the user. In this case, if a projection type is used, the projected GUI is difficult to view because of being overlapped with a real object such as cups or dishes, or the GUI projected onto some food causes its appearance to be worse. When the GUI remains at a position being overlapped with a real object, it is necessary to move the real object to operate the GUI, resulting in inconvenience. When the information processing apparatus 100 is used as a rear projection type or a flat arrangement display type, if the GUI remains at a position hidden under a real object, the user will lose sight of the GUI. Thus, according to an embodiment, when a position at which the displayed GUI (i.e. virtual object) is displayed is changed depending on the user's operation, the display control may be performed in consideration of a real object placed on a display surface, thereby displaying information in a more suitable and efficient manner.

Such display control will be described in more detail with reference to FIG. 14. FIG. 14 is a flowchart illustrating a display control process performed by the information processing system according to an embodiment of the present disclosure.

As shown in FIG. 14, in step S103, the controller 120 of the information processing apparatus 100 acquires "content control information: start condition". In other words, the controller 120 acquires the operation particulars on the content (specifically, GUI of application) performed by the user inputted from the input unit 110, refers to the content control information stored in a storage unit, and determines whether a condition of starting the movement display control (specifically, slide operation) is satisfied.

<3-1. Start Condition>

A start condition according to an embodiment will be described with reference to FIGS. 15 and 16. FIG. 15 is a diagram illustrated to describe a first start condition according to an embodiment. As shown in the left part of FIG. 15, when a drag operation is performed to move a content item 30 displayed on the top surface 141 that is the display surface in a state where the content item is in contact with an operating body such as a finger, the movement display control according to an embodiment is not started. On the other hand, as shown in the right part of FIG. 15, when a flick operation is performed to move the content item 30 displayed on the top surface 141 that is the display surface with the content item being in contact with an operating body such as a finger and to release the finger or the like from the content item by giving momentum, the controller 120 determines that the start condition is satisfied, and then the movement display control according to an embodiment is started.

FIG. 16 is a diagram illustrated to describe a second start condition according to an embodiment. As shown in the left part of FIG. 16, when the content item 30 is operated in a predetermined region S10 located in front of the user on the top surface 141, the movement display control according to an embodiment is not started. On the other hand, as shown in the right part of FIG. 16, when the drag operation is performed on the content item 30 outside the predetermined region S10, the controller 120 determines that the start condition is satisfied, and then the movement display control according to an embodiment is started.

As described above, when the flick operation is performed on the content item 30 or when the content item 30 is moved outside the predetermined region S10, the controller 120 determines that the start condition of movement display control is satisfied. The start condition described above is merely an example, and the present disclosure is not limited thereto.

Referring back to FIG. 14, in step S106, if the controller 120 determines that the start condition is satisfied (YES in step S106), then in subsequent step S109, the controller 120 acquires "content control information: slide route and slide speed". In other words, the controller 120 acquires (sets) the slide route and slide speed depending on the moving direction of the flick operation by the user or the size of the content.

<3-2. Slide Route and Slide Speed>

The acquisition of the slide route and slide speed according to an embodiment will be described with reference to FIGS. 17 to 25. FIG. 17 is a diagram illustrated to describe how to acquire a first slide route according to an embodiment. As shown in FIG. 17, when there is no obstacle (real object) on the top surface 141, the controller 120 sets a point where the user's finger is removed from the content item 30 by the flick operation as a start point S, and sets a point of a predetermined distance D on the straight line in the moving direction of the flick operation from the start point S as a termination point T. Then, the controller 120 acquires the shortest route (i.e. the straight line) from the start point S to the termination point T as a slide route. The predetermined distance D is calculated based on the moving speed of the flick operation and the virtual coefficient of friction with the top surface 141. When there is no obstacle (real object) on the top surface 141, the user views the content item 30, which moves from the start point S to the termination point T, without losing sight of it.

On the other hand, the description of how to acquire the slide route when there is an obstacle (real object) on the top surface 141 will be made with reference to FIG. 18. FIG. 18 is a diagram illustrated to describe how to acquire a second slide route according to an embodiment. As shown in the left part of FIG. 18, when there is an obstacle to the dishes 5a and 5b on the top surface 141 and the shortest route (i.e. the straight line) from the start point S to the termination point T intersects (collides) with the obstacle, the controller 120 acquires a route that circumvents the obstacle as a slide route. In this case, the controller 120 recognizes in advance the position of an object depending on the conditions of the object (size and position of the object) placed on the top surface 141, which is inputted from the input unit 110, and thus acquires a route that circumvents the object. The description of how to search a route that circumvents an object will be made later with reference to FIGS. 19 to 25.

The controller 120 may acquire a route in which the moving direction changes as a slide route, as shown in the right part of FIG. 18. In the route to be acquired as a slide route, the content item 30 is moved along the shortest route to the termination point T (i.e. the straight line) and reflects the route to the dish Sb at the time when the content item 30 reaches the dishes 5a as an obstacle. In this case, even when the controller 120 does not recognize in advance the position of a real object or when a real object is placed on the route after the movement control of the content item 30 by the flick operation is started, it is possible to prevent a real object and the content item 30 to be overlapped with each other.

As described above, by acquiring a route that circumvents an object or a route reflected from an object, the content item 30 that moves away from the user's finger can be prevented from losing sight of the content item 30. Subsequently, the description of how to search a route that circumvents an object will be made in more detail with reference to FIGS. 19 to 25.

FIGS. 19 to 25 are diagrams illustrated to describe how to search a route that circumvents an object to acquire the second slide route according to an embodiment. The controller 120 recognizes an object placed on the top surface 141 and determines object regions 50a and 50b on which an object is placed, as shown in FIG. 19. When a camera or depth sensor is used as the input unit 110, an object may be recognized based on a captured image and depth information that are inputted from the input unit 110. The controller 120 recognizes that the flick operation is performed by the user's finger in contact with the content item 30 based on the operation particulars inputted from the input unit 110. The controller 120 estimates the moving direction and the termination point T from the vector at the time of the flick operation on the content item 30 as shown in the left part of FIG. 19.

The controller 120 sets control points C1 and C2 of the three-dimensional Bezier curve on the shortest route between the start point S and the termination point T (straight line) as shown in the right part of FIG. 19. The controller 120 then determines whether the route collides with the object region 50a or 50b. The determination as to whether there is a collision uses an ordinary algorithm and thus the method for determination is not limited. For example, the controller 120 performs intersection determination by calculating the outer product of four sides of the object region 50a or 50b and the straight line or curved line.

In the example shown in FIG. 19, it is determined that the router connecting the start point S and the termination point T intersects with the object region 50a and collides with an object, and thus the controller 120 shifts the control points C1 and C2 from the initial position as shown in the left part of FIG. 20 and again determines whether there is a collision with an object. The route shown in the left part of FIG. 20 also collides with the object region 50a, and thus the controller 120 shifts the control points C1 and C2 to another points and again determines whether there is a collision with an object as shown in the right part of FIG. 20. In this way, the controller 120 repeatedly performs the collision determination and adjustment on the control points C1 and C2, and then searches a route that does not collide with the object regions 50a and 50b.

As shown in the left part of FIG. 21, if a route that does not collide with object regions 50a and 50b is found, then the controller 120 acquires the found route as a slide route and slides the content item 30 along a curve as shown in the right part of FIG. 21.

If object regions 50a, 50b, and 50c are placed as shown in FIG. 22, a route that does not collide with the object regions 50a, 50b, and 50c is failed to be found. Thus, the controller 120 may exceptionally acquire the shortest route to the termination point T (straight line) as a slide route, as shown in the left part of FIG. 22. In this case, the controller 120 slides the content item 30 from the start point S toward the termination point T along the straight line as shown in the right part of FIG. 22. When the projection type information processing apparatus 100 is used as shown in FIG. 1, the content item 30 passing through the object region 50a is projected onto an object. Thus, the content item 30 is difficult to view and, when the object is a dish, the appearance of food on it becomes worse. Thus, the controller 120 may adjust transmittance of the content item 30 in such a way that the content item 30 may be translucent when passing through the object region 50a. Furthermore, an appearance of an object (such as the content item 30), or a displaying of the object, may be made based on virtual physical amounts of items or contents associated with or represented by the object.

The description of how to acquire a slide route has been made. The description of how to acquire a slide speed will be made with reference to FIGS. 23 and 24. The speed of the content item 30 when the content item 30 is moved depending on the flick operation is calculated by using the virtual coefficient of friction between the moving speed upon the flick operation and the top surface 141 (or based on a coefficient of restitution associated with a collision or contact with the content item 30). By making the coefficient of friction proportional to the size (capacity) of content to be moved, the user can intuitively recognize the magnitude of capacity of content.

For example, as shown in FIG. 23, the coefficient of friction when the content item of a single music file slides is set to be smaller than the coefficient of friction when content item 32 of three music files together slides. In this way, as the number of moving content items (i.e. the number of files) is smaller, the coefficient of friction (i.e. resistance) is set to be lower. As the number of files is larger, the coefficient of friction is set to be higher. Accordingly, even when the user removes the finger from a content item at the same moving speed, the slide speed and the slide distance vary depending on the number of content items. Specifically, as shown in FIG. 23, the content item 30 having smaller number of files and lower coefficient of friction is moved at higher speed and longer distance than the content item 32 having larger number of files and higher coefficient of friction. In this way, the user can intuitively recognize the magnitude of capacity of the sliding content. The magnitude can also be represented by a number of rotations the content item 32 is displayed to make, when the content item 32 is displayed to rotate while moving. The magnitude can also be represented by a sound, and the sound can further be generated to be a higher or a lower volume, based on the magnitude. Furthermore, an appearance of an object (such as the content item 32), or a displaying of the object, may be made based on the number of content items.

Such coefficient of friction is not limited to the number of moving files, but it may be varied depending on the capacity of a file. For example, as shown in FIG. 24, the coefficient of friction when a content item 34 of a moving image file having a time length of five minutes is slid is set to be smaller than the coefficient of friction when a content item 35 of a moving image file having a time length of 30 minutes is slid. In this way, as the size of moving content items (i.e. the size of file) is smaller, the coefficient of friction is set to be lower. As the size is larger, the coefficient of friction is set to be higher. Accordingly, even when the user removes the finger from a content item at the same moving speed, the slide speed and the slide distance vary depending on the size. Specifically, as shown in FIG. 24, the content item 34 having smaller size and lower coefficient of friction is moved at higher speed and longer distance than the content item 35 having larger size and higher coefficient of friction. In this way, the user can intuitively recognize the magnitude of capacity of the sliding content. Furthermore, an appearance of an object (such as the content item 32), or a displaying of the object, may be made based on the size of the file, and the size of the file may be a time length or an image size. Alternatively, the appearance of the object, or the displaying of the object, may be made based on a weight of the object, an importance of the object or of contents associated with the object, or a length of time contents associated with the object have been placed.

As described above, according to an embodiment, by changing the virtual coefficient of friction with the top surface 141 used in the calculation of the slide moving speed depending on the capacity of content (the number or size of files), the user can intuitively recognize the capacity of content. This allows a usage pattern as shown in FIG. 25 to be implemented.

FIG. 25 is a diagram illustrated to describe advantageous effects obtained by the slide speed control depending on the capacity of content according to an embodiment. As shown in the upper part of FIG. 25, a user A slides a content item 32, which is formed by selecting and collecting some recommended songs (content of music file), toward a user B by performing the flick operation on the content item. At this time, the information processing apparatus 100 sets the moving speed of the flick operation by the user A by calculating the coefficient of friction that is increased in proportion to the capacity of the content item 32 (e.g., sum of sizes), and controls the movement of the content item 32. This allows the user B to view the flick operation performed by the user A or the content item 32 slid from the user A, and to intuitively recognize the capacity of the content item 32.

When the user B determines that the capacity is insufficient if all of the music files included in the content item 32 are transferred to a portable music player 6 depending on the recognized capacity, the user B divides the music files included in the content item 32 into content items 32a, 32b, and 32c as shown in the middle part of FIG. 25. Then, the user B can transfer only a content item (e.g., content item 32a) selected from the content items 32a, 32b, and 32c to the portable music player 6 as shown in the lower part of FIG. 25. When the content item 32a is close to the portable music player 6 placed on the top surface 141 by the user's operation, the information processing apparatus 100 establishes a wireless communication with the portable music player 6 and controls the content item 32a to be transferred.

Referring back to FIG. 14, in step S112, the controller 120 updates display of content, that is, performs the slide movement control, based on the content control information including the slide route and slide speed obtained in step S109.

In step S115, the controller 120 determines whether a termination condition is satisfied. The description of the termination condition according to an embodiment will be made in detail with reference to "3-4. Termination Condition" described later.

If it is determined that the termination condition is not satisfied (NO in step S115), the controller 120 determines in step S121 whether the sliding content is close to a real object placed on the top surface 141. Specifically, the controller 120 determines whether the content is in proximity to a real object by referring to a captured image, depth information or the like inputted from the input unit 110.

If it is determined that the content is in proximity to an object (YES in step S121), the controller 120 acquires "content control information: object proximity operation" in step S124. In the above embodiment, in the case where a content item is controlled to be not overlapped with an object using a route obtained by circumventing the object or reflecting from the object as shown in FIG. 18 when the content is allowed to be slid, if a route circumventing an object is failed to be found, the content is controlled to pass through the object without any modification as shown in FIG. 22. In addition to this, the controller 120 according to an embodiment can also acquire a route that passes through the object by moving it on the straight line from a start point to a termination point, regardless of presence of absence of a route that circumvents an object. Thus, if a route passing through an object is acquired in step S112, the controller 120 controls display of the content to perform a predetermined object proximity operation depending on the property of the object when the content is in proximity to the object (step S124). The first to fourth object proximity operations according to an embodiment will be described with reference to FIGS. 26 to 29.

<3-3. Object Proximity Operation>

FIG. 26 is a diagram illustrated to describe the first object proximity operation according to an embodiment. As shown in FIG. 26, for example, the controller 120 controls the content item 30 to pass through a dish 5c depending on the color of the object, with the transmittance of the content item 30 maintained. Specifically, for example, when an object in proximity to the content has a handle or has a dark color, the content item 30 projected by the projection type information processing apparatus 100 is controlled to be translucent. In this case, the user may lose sight of the content item 30 when the content item passes through (overlaps with) the object. Thus, when an object close to the content has a handle or has a dark color, the controller 120 controls display of the content item 30 to pass through the object, with the transmittance of the content item 30 maintained.

FIG. 27 is a diagram illustrated to describe the second object proximity operation according to an embodiment. As shown in FIG. 27, for example, the controller 120 controls the content item 30 to pass through a dish 5d depending on the color of an object by setting the content item 30 to be translucent. Specifically, for example, in the case where an object in proximity to the content has a white or light color, even when the content item 30 projected by the projection type information processing apparatus 100 is controlled to pass through the object in a translucent state, the user does not lose sight of the content item 30. Thus, when an object in proximity to the content has a white or light color, the controller 120 controls the content item 30 to pass through the object by changing the state of the content item 30 to a translucent state. This prevents the user from losing sight of the content item 30 when the content item 30 passes through the object, and this prevents appearance of the food on the dish 5d overlapped with the content item 30 from being worse.

FIG. 28 is a diagram illustrated to describe the third object proximity operation according to an embodiment. As shown in FIG. 28, for example, the controller 120 controls the content item 30 to pass through a dish 5e by setting the content item 30 to be a transparent state (i.e. non-display) depending on a material of an object. Specifically, in the case where an object in proximity is made of a material such as a mirror or is made of a transparent material such as glass, if the content item 30 is projected onto the object by the projection type information processing apparatus 100, the projection light reflected by the object may enter the eyes of the user, or the projection light is irregularly reflected and then an image of the content item 30 may be unclear. Thus, when an object in proximity is made of a material that reflects light like a mirror or glass, the controller 120 controls the content item 30 to pass through the object by changing the state of the content item 30 to be a transparent state (i.e. non-display). This makes it possible to prevent the projection light passed through the object from being reflected.

FIG. 29 is a diagram illustrated to describe the fourth object proximity operation according to an embodiment. As shown in FIG. 29, for example, the controller 120 controls the content item 30 to pass through a dish 5f, with the content item 30 maintained in a transparent state (i.e. non-display) or with the transmittance of the content item 30 maintained, depending on the state of the object. Specifically, for example, the display control on the content item 30 is performed as follows. When there is food in the dish 5f as shown in the left part of FIG. 29, the content item 30 is controlled to pass through the object by changing its state to a transparent state (i.e. non-display). When no food is left in the dish 5f as shown in the right part of FIG. 29, the content item 30 is controlled to pass through the object, with the transmittance of the content item 30 maintained. This makes it possible for the projection type information processing apparatus 100 to pass the content item 30 through the object in a non-display state, thereby preventing appearance of the food overlapped with an image from being worse (it looked so unappetizing) even when the user may lose sight of the content item 30. The presence or absence of food is estimated based on a captured image or depth information. If no food is left on the dish 5f after eating, it is not necessary to consider the appearance of food. Thus, the content item 30 is passed without any change, with the transmittance maintained, thereby preventing the user from losing sight of the content item 30.

The display control at the time of passage of content depending on the properties (color, material, state, etc.) of an object in proximity has been described in detail. The display control information (content control information) depending on the properties of an object is stored, for example, in a storage unit (not shown) of the controller 120.

In the example described above, in step S109, although the details of how to acquire a route circumventing an object, a route reflected from an object, or a route passing through an object as a slide route have been described, an embodiment is not limited thereto. For example, it is possible to acquire an adequate route among routes that circumvents an object in proximity and passes the object depending on the properties of the object. There will be described an exemplary display control by the controller 120 in the case where an adequate route among routes that circumvents an object in proximity and passes the object is acquired depending on the properties of the object.

When an object in proximity has a height larger than the user's point of view, the content item passing through the object is projected on the upper surface of the object, and thus it is not visible to the user. When the content remains at a position overlapped with the object, the user will lose sight of the content. Thus, the controller 120 controls the content to circumvent the object with a height higher than a predetermined value when the content is close to the object.

When an object in proximity is made of a material that reflects light like a mirror or glass, the projection light is irregularly reflected and then an image may be unclear. Thus, the controller 120 may control the content to circumvent the object made of such material when the content is in proximity to the object.

When an object in proximity is filled with food, the appearance of food becomes worse because the projection light is overlapped with the food. Thus, the controller 120 may control the content to circumvent the object filled with food when the content is in proximity to the object.

It is possible to recognize in advance the position of an object that is placed for a long time, but for an object that is placed temporarily, it is difficult to recognize in advance the position of the object at the time of acquisition of a route (the start of slide). Thus, the controller 120 may control the object in which its position is recognized in advance (object placed for a long time) to be circumvented when the object is in proximity and the object that is temporarily placed to be passed through.

When the rear projection type or flat arrangement display type information processing apparatus 100 is used, if the slide movement of content is stopped at a position in which an object is placed, the user may lose sight of the content or the object is necessary to be moved to operate the content. In particular, when an object in proximity is placed for a long time, it is expected that the object is heavy and thus is difficult to move or it is expected to be undesirable to change the home position of the object. Thus, the controller 120 may control the object that is placed for a long time to be circumvented and the object that is temporarily placed to be passed through.

<3-4. Termination Condition>

Subsequently, the "termination condition" mentioned in step S115 will be described with reference to FIGS. 30 and 31.

FIG. 30 is a diagram illustrated to describe a first termination condition according to an embodiment. As shown in FIG. 30, the controller 120 may stop the slide movement of the content item 30 by causing the content item to go into a stall by virtual friction with the top surface 141.

FIG. 31 is a diagram illustrated to describe a second termination condition according to an embodiment. As shown in FIG. 31, when the hand that is close to the content item 30 has a particular posture, the controller 120 controls the slide movement of the content item 30 to be stopped. More specifically, as shown in FIG. 31, for example, the palm of the hand is directed to face the direction in which the content item 30 travels, and a state that stands perpendicular to the top surface 141 is recognized as a particular posture.

The termination condition according to the present embodiment has been described. The termination condition according to an embodiment is merely an example, and in addition to this, for example, the movement may be controlled to be stopped when the edge of the top surface 141 is reached.

<3-5. Termination Process>

Referring back to FIG. 14, if it is determined that the termination condition is satisfied (YES in step S115), then the controller 120 controls a predetermined termination process to be performed. The termination process according to an embodiment will be described in detail with reference to FIGS. 32 to 37.

FIG. 32 is a diagram illustrated to describe a first termination process according to an embodiment. As shown in FIG. 32, when a real object such as a dish 5 is plated in proximity to a position at which the content item 30 goes into a stall, the controller 120 controls the content item 30 to approach the real object and controls display of the content item 30 to be aligned around the real object. This makes it possible to prevent each content item that is slid around the real object from being displayed irregularly. In the case where the content item 30 is overlapped with a real object such as a dish 5 when the content item 30 is stopped by causing the content item 30 to go into a stall, the content item 30 may be moved to a position not to be overlapped with the real object by shifting the stop position.

In this way, as an example, the controller 120 according to an embodiment performs a termination process depending on a real object placed in proximity to the location where the content item 30 goes into a stall. When a real object has a communication function, if the type of content is equal to the type of data handled by the real object, the controller 120 can perform a termination process for transferring content to the real object. The description will be made with reference to FIG. 33.

FIG. 33 is a diagram illustrated to describe another example of the first termination process according to an embodiment. As shown in the left part of FIG. 33, when a sliding content item 37 is a photograph file and a real object placed near the stop position of the content item 37 is a device that handles a photograph file, such as a digital camera or smartphone, the controller 120 establishes a wireless communication with a digital camera 7 and controls the content item 37 to be transferred to the digital camera 7. On the other hand, as shown in the right part of FIG. 33, when a sliding content item 30 is a music file and a real object placed near the stop position of the content item 30 is a digital camera 7 that does not handle a music file, the controller 120 does not transfer the content item to the digital camera 7.

The termination process depending on a real object placed in proximity to the location where content goes into a stall has been described. The controller 120 according to an embodiment can also perform the termination process depending on a GUI of application displayed in proximity to the location where content goes into a stall. The description will be made with reference to FIGS. 34 and 35.

FIG. 34 is a diagram illustrated to describe a second termination process according to an embodiment. As shown in FIG. 34, when the sliding content item 37 is a photograph file and the GUI displayed in proximity to the stop position of the content item 37 is a photograph application's GUI 45 that handles a photograph file, the controller 120 controls the content item 37 to be displayed on the photograph application's GUI 45 by incorporating the content item 37 into the photograph application's GUI 45.

FIG. 35 is a diagram illustrated to describe another example of the second termination process according to an embodiment. As shown in FIG. 35, when a sliding content item 38 is a photograph file and the GUI displayed in proximity to the stop position of the content item 38 is a mail screen 46, the controller 120 controls the content item 38 to be pasted to the mail screen 46.

In this way, even when there are the same type of content items (e.g., photograph file in the example shown in FIGS. 34 and 35), different termination processes are performed depending on the application displayed in proximity to the content item (e.g., incorporation of application in the example shown in FIG. 34, and paste of a mail in the example shown in FIG. 35).

When a content item is stopped at the other user side (it is stopped near a user), the controller 120 according to an embodiment can also control to perform a termination process for changing display of content to be optimized for the user. The description will be made with reference to FIGS. 36 and 37.

FIG. 36 is a diagram illustrated to describe a third termination process according to an embodiment. As shown in FIG. 36, for example, when the content item 37 is slid to the user B, the controller 120 performs display control by rotating the content item 37 in a direction that is easy to be viewed from the user B. When a plurality of content items are slid to the user B, the controller 120 may align the plurality of content items so that a plurality of content items are not overlapped with each other at the edge of the top surface 141 on the user B, or the controller 120 may align the plurality of content items in such a way that a plurality of content items are overlapped with each other at the edge of the top surface 141 on the user B. When a plurality of content items are displayed to be overlapped at the edge on the user B, the controller 120 adjusts the overlapped position using a random number in such a way that at least a portion of each of the content items may be visible.

FIG. 37 is a diagram illustrated to describe another example of the third termination process according to an embodiment. As shown in FIG. 37, the controller 120 optimizes display of content depending on the attribute of a person in proximity to the location where content is stopped. Specifically, as shown in the left part of FIG. 37, when a user C in proximity to the location where a content item 39 is stopped is an aged person, the controller 120 may control the font size or image size of the content item 39 to be displayed in an enlarged form. As shown in the right part of FIG. 37, when a user D in proximity to the location where a content item 40 is stopped is a foreigner, the controller 120 may control the text of the content item 40 to be displayed in a translated version, or may control a locale to be changed. The attribute of a person is obtained by the analysis of a captured image or the like acquired by the input unit 110. To optimize display of the contents of a content item, information indicating what change is necessary may be associated with each region of a display surface, and the contents associated with a region including a movement destination may be further changed. For example, an English region, a German region, and a region where text is displayed in an enlarged form are set in advance, and a change including English translation, German translation, and enlargement of text may be added to each region including a movement destination.

«4. Supplement»

The information processing system according to an embodiment of the present disclosure has been described in detail. Next, a supplement to the information processing system according to an embodiment of the present disclosure will be described.

<4-1. Prevention of Erroneous Operation in Sliding>

In an embodiment, an operation on a content item during sliding may be not accepted. More specifically, the controller 120 allows display control of only a content item itself (e.g., movement in x-y axis, transmittance, and rotation) to be performed during sliding, and prevent an event (e.g., linking in a content item or clicking buttons) within a content item (GUI) from being accepted. This makes it possible to prevent unintended events from being accepted during sliding, thereby preventing erroneous operations. An example thereof will be described with reference to FIGS. 38 and 39.

FIGS. 38 and 39 are diagrams illustrated to describe how to disable the event for a content item during sliding. This example is based on the assumption that a GUI of a game application (content item 42) is displayed on the top surface 141, and a user A plays a game with a user B. As shown in the left part of FIG. 38, when the user A makes the first move on the content item 42 displayed on the game board screen, the content item 42 is slid in the direction of the opponent user B as shown in the right part of FIG. 38.

While the content item 42 is slid to the user B, in the case in which the content item 42 passes through a location where a bystander, user C taps on the top surface 141, if the user C taps on the content item 42 by mistake as shown in the left part of FIG. 39, the controller 120 prevents the operation from being accepted. This makes it possible to prevent an erroneous operation (miss the order) of the content item 42 during sliding. As shown in the right part of FIG. 39, when the content item 42 reaches the user B and then is stopped, the controller 120 accepts an input of the second move by the user B.

<4-2. Transfer to Device on Extension of Sliding Direction>

In an embodiment described above, for example, as shown in FIG. 25, when the content item 32a is moved in proximity to the portable music player 6 placed on the top surface 141, the controller 120 controls the content item 32a to be transferred to the portable music player 6. In the example shown in FIG. 33, when the content item 37 is moved in proximity to the digital camera 7 placed on the top surface 141, the controller 120 controls the content item 37 to be transferred to the digital camera 7. In this way, the controller 120 according to an embodiment establishes a wireless communication with a device that is placed on the top surface 141 and has a communication function, and allows the content item moved in proximity to the device to be transferred automatically.

The transfer of a content item according to an embodiment is not limited to the transfer to a device placed on the top surface 141. For example, a content item may be transferred to a device placed around the table 140. An example thereof will be described with reference to FIG. 40.

FIG. 40 is a diagram illustrated to describe a supplement to data transfer of the information processing system according to an embodiment. In FIG. 40, the projection type information processing apparatus 100a displays a content item 35 by projecting the content item 35 on the top surface 141a of the table 140a using an output unit 130a that includes a projector. The user's operation on the content item 35 is recognized based on information inputted by an input unit 110a that includes a camera and depth sensor. The controller 120 controls the content item 35 to be displayed depending on the particulars of the operation inputted from the input unit 110a. Specifically, the controller 120 allows the content item 35 to be slid in the moving direction at the time of the flick operation depending on the flick operation of the content item 35 by the user.

As shown in FIG. 40, on the side opposite to a user, there is no other person who locates at a movement destination of the sliding content item 35. In addition, there is no real object on the top surface 141a. However, there is a television set 8 on the extension line of the slide moving direction.

When the sliding content item 35 is a moving image file and there is the television set 8 for reproducing the moving image file on the extension line of the slide moving direction, the controller 120 controls the content item 35 reached a predetermined region S12 at the left end of the top surface 141a in FIG. 40 to be transferred to the television set 8. The transferred content item 35 is reproduced in the television set 8.

In this way, according to an embodiment, a content item can be transferred to a device (e.g., television set and audio device) in a location remote from the table 140a depending on the sliding direction of a content item. The positional relationship between the table 140a and the surrounding devices may be determined, for example, based on an image captured around the table 140a and obtained by the input unit 110a including a camera or by a communication between the information processing apparatus 100a and the surrounding devices.

<4-3. Others>

In an embodiment, when a content item is slid depending on the user's flick operation, the controller 120 may display the trajectory of the moving content item for a predetermined period of time (e.g., approximately three seconds) after the start of movement. The trajectory may be displayed in a string shape that is extended from the content item. When the user performs an operation of holding the string indicating the trajectory and of bring it back in front of the user, the controller 120 can controls the slid content item to be pulled by the string and brought back.

Alternatively, even in the case where the trajectory is not displayed, when the hand of the user who performed the flick operation of the content item for a predetermined period of time after the start of movement has a particular motion or shape to stop the content item during the sliding movement of the content item, it is also possible to perform display control to return the slid content item back.

In this way, even when a flick operation is performed by mistake, it is possible to stop the movement of the content item and to return it back as an exceptional case.

In the case where the user flicks a content item and the display surface is slid, when the name of an opponent user who wants to make the content item reached is issued, the controller 120 recognizes the opponent user by audio analysis. When the direction in which the recognized opponent user is located and the direction in which the content item is slid are different from each other, the controller 120 may modify the discrepancy, and may control the content item to be displayed so that the content item is delivered to the opponent user.

«5. Conclusion»

As described above, the information processing system according to an embodiment of the present disclosure is capable of displaying information in a more appropriate and efficient by controlling movement of a displayed virtual object depending on a positional relationship with a real object.

It should be understood by those skilled in the art that various modifications, combinations, sub-combinations and alterations may occur depending on design requirements and other factors insofar as they are within the scope of the appended claims or the equivalents thereof.

For example, a computer program that allows hardware including CPU, ROM, and RAM incorporated in the above-described information processing apparatus 100 to perform functions of the information processing apparatus 100 may also be created. A storage medium on which the computer program is stored may be provided.

Although the information processing system according to an embodiment of the present disclosure used as a projection type, a rear projection type, and flat arrangement display type has been described with reference to FIGS. 1 to 3, an embodiment of the present disclosure is not limited thereto. For example, the information processing apparatus 100 may be configured to include a head mounted display (HMD). In this case, the information processing apparatus 100 controls information to be displayed on the top surface 141 in such a way that the information is visible to the user through a display unit (output unit 130) of the HMD. The information processing apparatus 100 acquires the user's operation on the information displayed on the top surface 141 (e.g., drag operation or flick operation that is in contact with the top surface 141 and moves it with the finger) by the input unit 110 provided in the HMD, such as a camera or depth sensor. The information processing apparatus 100 may be configured to include the output unit 130 that constituted by the HMD.

In the above embodiments, there has been described the storage unit (local memory) included in the controller 120. The content control information is stored in the storage unit. An embodiment of the present disclosure is not limited to this configuration. The content control information may be stored in a server (external memory) on a network, which is connected by a communication function of the controller 120.

Although in an above embodiment a mode of controlling the movement (e.g., passing through or circumventing) of a virtual object is determined depending on the property information (e.g., size, dish, state) of a real object, an embodiment of the present disclosure is not limited thereto.

For example, the mode of controlling the movement of a virtual object may be determined depending on the property information of a real object and the property information of a virtual object, or may be determined only depending on the property information of a virtual object.

In addition, the effects described in the present specification are merely illustrative and demonstrative, and not limitative. In other words, the technology according to the present disclosure can exhibit other effects that are evident to those skilled in the art along with or instead of the effects based on the present specification.

Additionally, the present technology may also be configured as below.

(1)

An information processing apparatus including:
circuitry configured to
initiate display of a virtual object, based on a gesture operation, starting from a point of origin and moving towards a target point; and
continue to display the virtual object in display motion after the gesture operation,
wherein a path of travel of the virtual object or a display characteristic of the virtual object is determined based on a positional relationship between the virtual object and another object that is a real object located in proximity to the path of travel of the virtual object, and when the virtual object passes or enters into a predetermined area of the another object, the path of travel is diverted from a direct path or the display characteristic is changed.

(2)

The information processing apparatus according to (1), wherein the path of travel of the virtual object or the display characteristic of the virtual object is determined when the virtual object passes or enters into a predetermined area of the another object, and the path of travel is diverted from a direct path or the display characteristic is changed.

(3)

The information processing apparatus according to (1) or (2), wherein a mode of display moving the virtual object is changed based on information associated with the real object.

(4)

The information processing apparatus according to any of (1) to (3), wherein the information includes height information of the real object.

(5)

The information processing apparatus according to any of (1) to (4), wherein the virtual object is displayed to travel a route of display motion that circumvents a predetermined area of the real object, when the real object has a height taller than a user point of view.

(6)

The information processing apparatus according to any of (1) to (5), wherein the information includes material information of the real object.

(7)

The information processing apparatus according to any of (1) to (6), wherein the virtual object is displayed to travel a route of display motion that circumvents a predetermined area of the real object, when the real object is made of a reflective material.

(8)

The information processing apparatus according to any of (1) to (7), wherein the information includes information indicating a categorical type of the real object.

(9)

The information processing apparatus according to any of (1) to (8), wherein the virtual object is displayed to travel a route of display motion that circumvents a predetermined area of the real object, when the real object includes food.

(10)

The information processing apparatus according to any of (1) to (9), wherein a route of display motion that circumvents the predetermined area of the another object is determined in advance of setting the virtual object into display motion, based on a location of the another object.

(11)

The information processing apparatus according to any of (1) to (10), wherein a circumvention route of display motion that circumvents the predetermined area of the another object is determined after the virtual object has been set into display motion and approaching the predetermined area of the another object.

(12)

The information processing apparatus according to any of (1) to (11), wherein a display appearance of the virtual object is changed to be more translucent when the virtual object is displayed to be passing or entering the predetermined area of the another object.

(13)

The information processing apparatus according to any of (1) to (12), wherein the virtual object, when displayed to be passing or entering the predetermined area of the another object, is displayed to have a transmittance determined based on a characteristic of the another object.

(14)

The information processing apparatus according to any of (1) to (13), wherein the characteristic of the another object is related to a color or a shape.

(15)

The information processing apparatus according to any of (1) to (14), wherein a mode of display moving the virtual object is changed based on information associated with the another object.

(16)

The information processing apparatus according to any of (1) to (17), wherein the circuitry is further configured to stop display motion of the virtual object when the virtual object visually collides with a hand of the user having a particular posture.

(17)

The information processing apparatus according to any of (1) to (16), wherein the display motion of the virtual object is controlled based on a quantity characteristic or a length characteristic of the virtual object.

(18)

The information processing apparatus according to any of (1) to (17), wherein the virtual object is displayed in display motion having a movement speed based on a speed of performing the gesture operation and based on a virtual coefficient of friction with a display surface.

(19)

The information processing apparatus according to any of (1) to (18), wherein the display motion of the virtual object is controlled based on a number of or a size of contents associated with the virtual object.

(20)

The information processing apparatus according to any of (1) to (19), wherein the display motion of the virtual object is controlled based on a perceived weight of the virtual object.

(21)

The information processing apparatus according to any of (1) to (20), wherein the display motion of the virtual object is controlled based on an importance degree of contents of the virtual object.

(22)

The information processing apparatus according to any of (1) to (21), wherein the circuitry is further configured to initiate a playing of a sound when the virtual object is displayed to be in display motion, wherein the sound is based on a virtual amount of contents associated with the virtual object.

(23)

An information processing method including:
displaying a virtual object, based on a gesture operation, starting from a point of origin and moving towards a target point; and
continuing to display the virtual object in display motion after the gesture operation,
wherein a path of travel of the virtual object or a display characteristic of the virtual object is determined based on a positional relationship between the virtual object and another object that is a real object located in proximity to the path of travel of the virtual object.

(24)

A non-transitory computer-readable medium having embodied thereon a program, which when executed by a computer causes the computer to execute an information processing method, the method including:
displaying a virtual object, based on a gesture operation, starting from a point of origin and moving towards a target point; and
continuing to display the virtual object in display motion after the gesture operation,
wherein a path of travel of the virtual object or a display characteristic of the virtual object is determined based on a positional relationship between the virtual object and another object that is a real object located in proximity to the path of travel of the virtual object.

(25)

An information processing apparatus including:
a controller configured to control display of a virtual object depending on a user's operation on the displayed virtual object,
wherein the controller controls display of the virtual object depending on positional relationship between the virtual object and a real object located in proximity to a moving path of the virtual object when the virtual object is moved.

(26)

The information processing apparatus according to (25), wherein the controller moves an object to be displayed without another user's operation after the previous user's operation.

(27)

The information processing apparatus according to (26), wherein the controller acquires a moving speed and a moving path of the virtual object based on a moving direction and a moving speed of a predetermined user's operation on the virtual object.

(28)

The information processing apparatus according to (27), wherein the controller controls display of the virtual object in a manner that the virtual object is moved by circumventing the real object (29)

The information processing apparatus according to (27), wherein the controller controls display of the virtual object in a manner that the virtual object is moved by passing through the real object.

(30)

The information processing apparatus according to (27), wherein the controller controls display of the virtual object in a manner that a mode of moving the virtual object is changed based on information associated with the real object that is in proximity to the virtual object.

(31)

The information processing apparatus according to (27), wherein the controller controls display of the virtual object in a manner that a mode of moving the virtual object is changed based on information associated with the virtual object.

(32)

The information processing apparatus according to (30), wherein the controller controls display of the virtual object in a manner that the virtual object is moved by circumventing the real object or the virtual object is moved by passing through the real object based on information indicating a property of the real object that is in proximity to the virtual object.

(33)

The information processing apparatus according to (32), wherein the controller controls transmittance of the virtual object depending on a property of the real object when the virtual object passes through the real object.

(34)

The information processing apparatus according to (27), wherein the moving speed is calculated based on a moving speed in performing the predetermined user's operation and a virtual coefficient of friction with a display surface.

(35)

The information processing apparatus according to (34), wherein the virtual coefficient of friction is set in proportion to an amount of data of the virtual object.

(36)

The information processing apparatus according to any one of (25) to (35), wherein the virtual object is a GUI of application, a media file, or image data.

(37)

The information processing apparatus according to any one of (25) to (36), wherein the controller prevents an operation input to the virtual object from being accepted during control of a movement of the virtual object.

(38)

The information processing apparatus according to (37), wherein the controller performs control in a manner that a movement of the virtual object is stopped by colliding with a hand of a user when the hand of the user in proximity to the virtual object has a particular posture during control of a movement of the virtual object.

(39)

The information processing apparatus according to any one of (25) to (38), wherein, when a movement of the virtual object is stopped, the controller performs a termination process on the virtual object, depending on a function of another virtual object displayed in proximity to the stopped virtual object or a property of a real object in proximity to the stopped virtual object.

(40)

The information processing apparatus according to any one of (25) to (39), wherein the controller performs control in a manner that an output unit displays the virtual object on a display surface.

(41)

The information processing apparatus according to (40), wherein the output unit is a display device, a projector, or an HMD.

(42)

The information processing apparatus according to any one of (25) to (41), wherein the user's operation on the virtual object is obtained based on information inputted from an input unit.

(43)

A control method including:
controlling display of a virtual object depending on a user's operation on the displayed virtual object,
wherein display of the virtual object is controlled depending on positional relationship between the virtual object and a real object located in proximity to a moving path of the virtual object when the virtual object is moved.

(44)

A program for causing a computer to function as:
a controller that controls display of a virtual object depending on a user's operation on the displayed virtual object,
wherein the controller controls display of the virtual object depending on positional relationship between the virtual object and a real object located in proximity to a moving path of the virtual object when the virtual object is moved.

REFERENCE SIGNS LIST

100, 100a to 100c information processing system
110, 110a to 110c input unit
120 controller
122 detection unit
130, 130a to 130c output unit

The invention claimed is:

1. An information processing apparatus comprising:
   circuitry configured to
      initiate a display motion of a virtual object displayed by a display device, based on a gesture operation, starting from a point of origin and moving towards a target point; and
      continue to display the virtual object in the display motion after the gesture operation until the virtual object reaches the target point,
   wherein a path of travel of the virtual object or a display characteristic of the virtual object is determined based on a positional relationship between the virtual object and another object that is a real object located in proximity to a direct path of travel of the virtual object from the point of origin to the target point,
   wherein the target point is determined based on a speed of performing the gesture operation,
   wherein a mode of display moving the virtual object is changed based on information associated with the real object,
   wherein the information comprises height information of the real object, and
   wherein the virtual object is displayed to travel a route of display motion that circumvents a predetermined area of the real object, when the real object has a height taller than a predetermined value.

2. The information processing apparatus of claim 1, wherein the path of travel of the virtual object or the display characteristic of the virtual object is determined when the virtual object passes or enters into a predetermined area of the another object, and the path of travel is diverted from the direct path of travel or the display characteristic is changed.

3. The information processing apparatus of claim 1, wherein the information further comprises material information of the real object.

4. The information processing apparatus of claim 3, wherein the virtual object is displayed to travel a route of display motion that circumvents a predetermined area of the real object, when the real object is made of a reflective material.

5. The information processing apparatus of claim 1, wherein the information further comprises information indicating a categorical type of the real object.

6. The information processing apparatus of claim 5, wherein the virtual object is displayed to travel a route of display motion that circumvents a predetermined area of the real object, when the real object includes food.

7. The information processing apparatus of claim 2, wherein a route of display motion that circumvents the predetermined area of the another object is determined in advance of setting the virtual object into display motion, based on a location of the another object.

8. The information processing apparatus of claim 2, wherein a circumvention route of display motion that circumvents the predetermined area of the another object is determined after the virtual object has been set into display motion and approaching the predetermined area of the another object.

9. The information processing apparatus of claim 2, wherein a display appearance of the virtual object is changed to be more translucent when the virtual object is displayed to be passing or entering the predetermined area of the another object.

10. The information processing apparatus of claim 2, wherein the virtual object, when displayed to be passing or entering the predetermined area of the another object, is displayed to have a transmittance determined based on a characteristic of the another object.

11. The information processing apparatus of claim 10, wherein the characteristic of the another object is related to a color or a shape.

12. The information processing apparatus of claim 1, wherein a mode of display moving the virtual object is changed based on information associated with the another object.

13. The information processing apparatus of claim 1, wherein the circuitry is further configured to stop display motion of the virtual object when the virtual object visually collides with a hand of the user having a particular posture.

14. The information processing apparatus of claim 1, wherein the display motion of the virtual object is controlled based on a quantity characteristic or a length characteristic of the virtual object.

15. The information processing apparatus of claim 14, wherein the virtual object is displayed in display motion having a movement speed based on the speed of performing the gesture operation and based on a virtual coefficient of friction with a display surface.

16. The information processing apparatus of claim 1, wherein the display motion of the virtual object is controlled based on a number of or a size of contents associated with the virtual object.

17. The information processing apparatus of claim 1, wherein the display motion of the virtual object is controlled based on a perceived weight of the virtual object.

18. The information processing apparatus of claim 1, wherein the display motion of the virtual object is controlled based on an importance degree of contents of the virtual object.

19. The information processing apparatus of claim 1, wherein the circuitry is further configured to initiate a playing of a sound when the virtual object is displayed to be in display motion, wherein the sound is based on a virtual amount of contents associated with the virtual object.

20. An information processing method comprising:
displaying a display motion of a virtual object displayed by a display device, based on a gesture operation, starting from a point of origin and moving towards a target point; and
continuing to display the virtual object in the display motion after the gesture operation until the virtual object reaches the target point,
wherein a path of travel of the virtual object or a display characteristic of the virtual object is determined based on a positional relationship between the virtual object and another object that is a real object located in proximity to a direct path of travel of the virtual object from the point of origin to the target point,
wherein the target point is determined based on a speed of performing the gesture operation,
wherein a mode of display moving the virtual object is changed based on information associated with the real object,
wherein the information comprises height information of the real object, and
wherein the virtual object is displayed to travel a route of display motion that circumvents a predetermined area of the real object, when the real object has a height taller than a predetermined value.

21. A non-transitory computer-readable medium having embodied thereon a program, which when executed by a computer causes the computer to execute an information processing method, the method comprising:
displaying a display motion of a virtual object displayed by a display device, based on a gesture operation, starting from a point of origin and moving towards a target point; and
continuing to display the virtual object in the display motion after the gesture operation until the virtual object reaches the target point,
wherein a path of travel of the virtual object or a display characteristic of the virtual object is determined based on a positional relationship between the virtual object and another object that is a real object located in proximity to a direct path of travel of the virtual object from the point of origin to the target point,
wherein the target point is determined based on a speed of performing the gesture operation,
wherein a mode of display moving the virtual object is changed based on information associated with the real object,
wherein the information comprises height information of the real object, and
wherein the virtual object is displayed to travel a route of display motion that circumvents a predetermined area of the real object, when the real object has a height taller than a predetermined value.

22. The information processing apparatus of claim 1, wherein whether the path of travel of the virtual object is changed or the display characteristic of the virtual object is changed is determined according to a categorical type of the real object.

\* \* \* \* \*